(12) United States Patent
Husher et al.

(10) Patent No.: US 11,662,564 B2
(45) Date of Patent: May 30, 2023

(54) PARAFFIN SHIELD COATING FOR MICROSCOPE SLIDE

(71) Applicant: SHENZHEN PRS LIMITED, ShenZhen (CN)

(72) Inventors: Frederick Knute Husher, Shenzhen (CN); Jee Jong Shum, Shenzhen (CN)

(73) Assignee: SHENZHEN PRS LIMITED, Shenzhen (CN)

( * ) Notice: Subject to any disclaimer, the term of this patent is extended or adjusted under 35 U.S.C. 154(b) by 527 days.

(21) Appl. No.: 16/715,715

(22) Filed: Dec. 16, 2019

(65) Prior Publication Data

US 2020/0192072 A1    Jun. 18, 2020

Related U.S. Application Data

(63) Continuation of application No. PCT/CN2018/091383, filed on Jun. 15, 2018, and a
(Continued)

(51) Int. Cl.
*G02B 21/34* (2006.01)
*G01N 1/30* (2006.01)
(Continued)

(52) U.S. Cl.
CPC .............. *G02B 21/34* (2013.01); *G01N 1/30* (2013.01); *G01N 1/44* (2013.01); *G02B 1/14* (2015.01)

(58) Field of Classification Search
CPC . G02B 21/34; G02B 1/14; G01N 1/30; G01N 1/44; G01N 2001/305; G01N 1/31;
(Continued)

(56) References Cited

U.S. PATENT DOCUMENTS

| 4,190,314 A | 2/1980 | Goldsmith |
| 4,832,855 A | 5/1989 | Tanaka |

(Continued)

FOREIGN PATENT DOCUMENTS

| CN | 1288158 | 3/2001 |
| CN | 1957256 | 5/2007 |

(Continued)

OTHER PUBLICATIONS

S. Comsa, A. M. Cimpean, M. Raica, 'The Story of MCF-7 Breast Cancer Cell Line: 40 Years of Experience in Research', Anticancer Research, vol. 35, pp. 3147-3154, 2015. (Year: 2015).*

(Continued)

*Primary Examiner* — Arnel C Lavarias
(74) *Attorney, Agent, or Firm* — Hauptman Ham, LLP

(57) ABSTRACT

A shield coating on a microscope slide, and particularly a selective application of a paraffin layer to shield biomaterials and inorganic chemical deposits from microbial attack and oxidation, and more particularly, an application of a paraffin layer on a microscope slide as an exposure shield over deposited biomaterial reactive targets. The paraffin shield layer blocks the biomaterial and chemical targets from exposure, which may lead to degradation due to oxidation and provides resistance to fungal growth, while using the existing stain

Related U.S. Application Data continuation of application No. PCT/CN2018/091685, filed on Jun. 15, 2018, and a continuation of application No. PCT/CN2018/091686, filed on Jun. 15, 2018, and a continuation of application No. PCT/CN2018/091687, filed on Jun. 15, 2018, and a continuation of application No. PCT/CN2018/091689, filed on Jun. 15, 2018.

(60) Provisional application No. 62/520,169, filed on Jun. 15, 2017, provisional application No. 62/520,319, filed on Jun. 15, 2017, provisional application No. 62/520,178, filed on Jun. 15, 2017, provisional application No. 62/520,187, filed on Jun. 15, 2017, provisional application No. 62/539,281, filed on Jul. 31, 2017, provisional application No. 62/520,334, filed on Jun. 15, 2017, provisional application No. 62/520,341, filed on Jun. 15, 2017.

(51) Int. Cl.
*G01N 1/44* (2006.01)
*G02B 1/14* (2015.01)

(58) Field of Classification Search
CPC .............. G01N 1/312; G01N 21/6458; G01N 21/6456; G01N 2021/6482
USPC ............. 359/391, 396, 397, 398; 435/287.1, 435/287.9, 288.3, 288.4, 288.7, 289.1, 435/305.1, 305.2, 30, 5.3, 305.4, 307.1; 436/164, 172, 174, 176; 206/316.1, 454, 206/456; 73/863, 864.91; 356/244, 246
See application file for complete search history.

(56) References Cited

U.S. PATENT DOCUMENTS

| | | | |
|---|---|---|---|
| 2003/0166261 | A1 | 9/2003 | Sompuram et al. |
| 2005/0142654 | A1 | 6/2005 | Matsumoto et al. |
| 2014/0022631 | A1 | 1/2014 | Hunnell et al. |

FOREIGN PATENT DOCUMENTS

| | | | |
|---|---|---|---|
| CN | 101529247 | 9/2009 | |
| CN | 202002935 | 10/2011 | |
| CN | 102391655 | 3/2012 | |
| CN | 102540444 | 7/2012 | |
| CN | 102812392 | 12/2012 | |
| CN | 102939538 | 2/2013 | |
| CN | 103116018 | 5/2013 | |
| CN | 103328979 | 9/2013 | |
| CN | 103471892 | 12/2013 | |
| CN | 104086085 | 10/2014 | |
| CN | 204790174 | 11/2015 | |
| CN | 106596546 | 4/2017 | |
| GB | 2522231 | 7/2015 | |
| GB | 2524227 | 9/2015 | |
| JP | 2000-10017 | 1/2000 | |
| JP | 2000-500321 A * | 1/2000 | |
| WO | WO-9712957 A1 * | 4/1997 | ............ C12M 23/08 |
| WO | WO2006007726 | 1/2006 | |
| WO | WO2006031342 | 3/2006 | |
| WO | WO2009081165 | 7/2009 | |
| WO | WO2012143709 | 10/2012 | |
| WO | WO2013008142 | 1/2013 | |
| WO | WO2015187158 | 12/2015 | |
| WO | WO2016160545 | 10/2016 | |

OTHER PUBLICATIONS

International search report dated Sep. 12, 2018 from corresponding application No. PCT/CN2018/091383.

Yu, X. et al., "Detachment of methacrylate-embedded sections from microscope slides can be prevented by heating on hotplate", Journal of Histology & Histopathology, vol. 1, Dec. 31, 2014 (Dec. 31, 2014), ISSN: 2055-091X, pp. 1-4.

International search report dated Sep. 3, 2018 from corresponding application No. PCT/CN2018/091685.

International search report dated Sep. 6, 2018 from corresponding application No. PCT/CN2018/091686.

International search report dated Sep. 18, 2018 from corresponding application No. PCT/CN2018/091687.

Dupouy, D.G. et al., "Continuous quantification of HER2 expression by microfluidic precision immunofluorescence estimates HER2 gene amplification in breast cancer", Sci. Rep., vol. 6, Feb. 9, 2016 (Feb. 9, 2016), srep20277 pp. 1-10.

Taylor, C.R., "Immunohistochemistry in surgical pathology: principles and practice", Methods Mal. Biol., vol. 1180, Dec. 31, 2014 (Dec. 31, 2014), pp. 81-109.

International search report dated Sep. 10, 2018 from corresponding application No. PCT/CN2018/091689.

\* cited by examiner

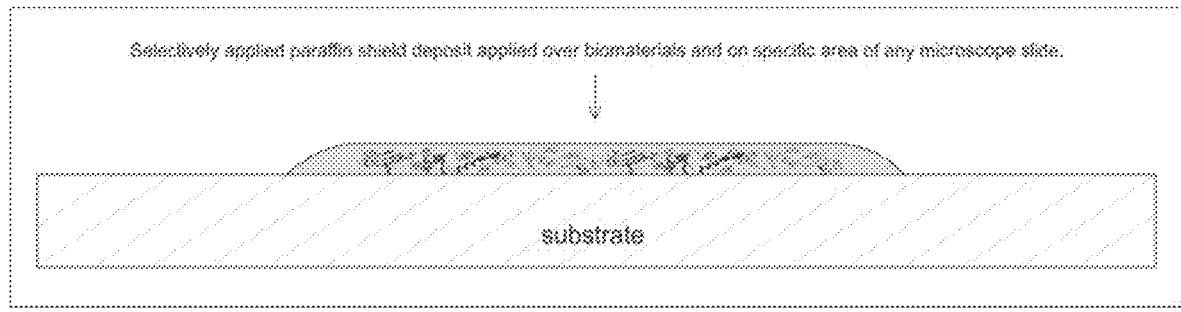
Figure 1
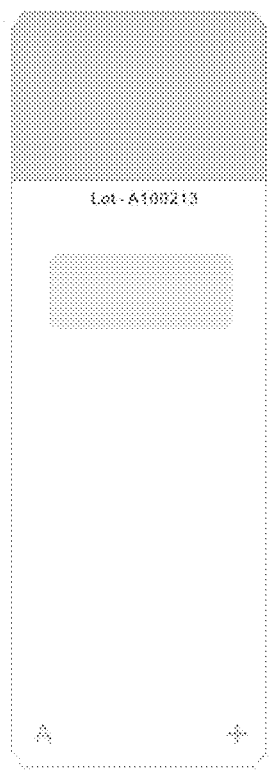
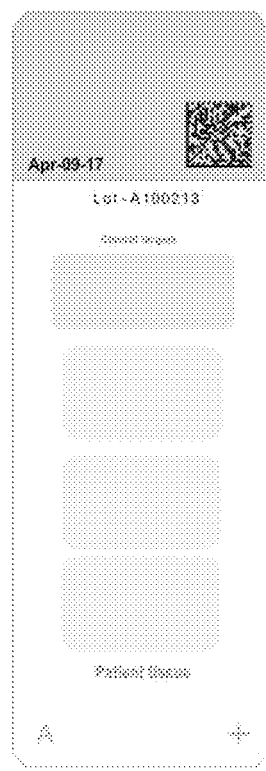
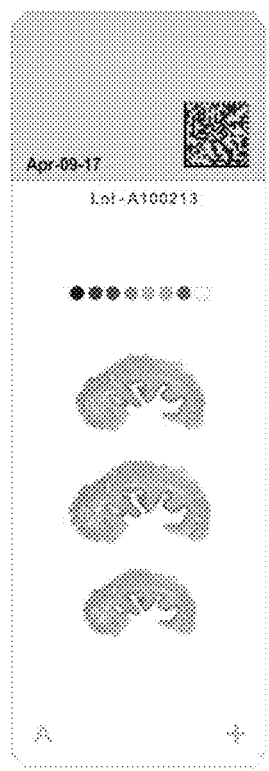
Figure 2A      Figure 2B      Figure 2C

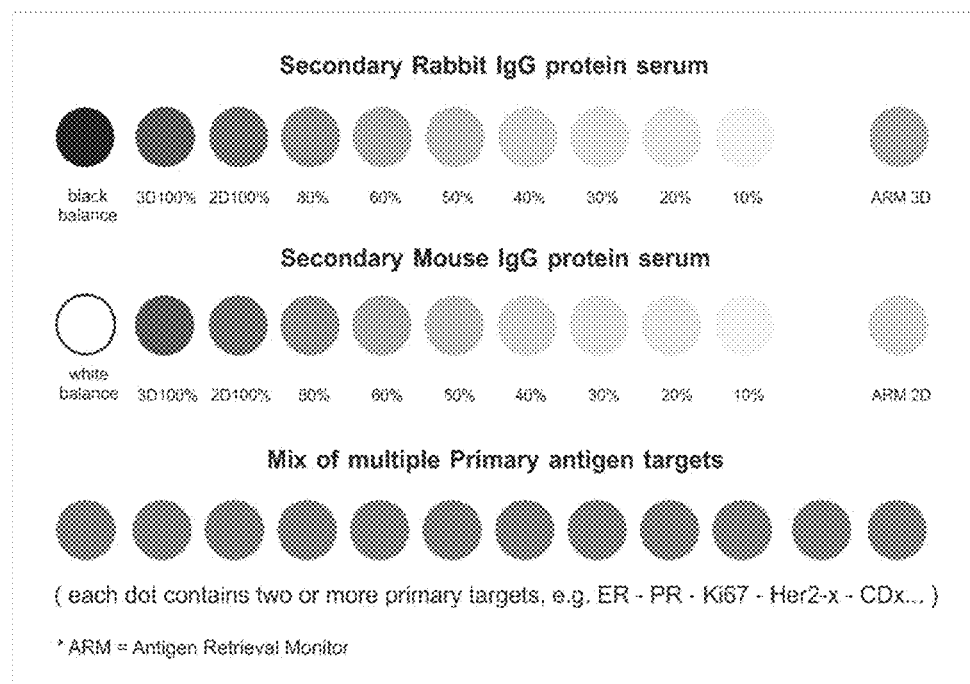
Figure 3
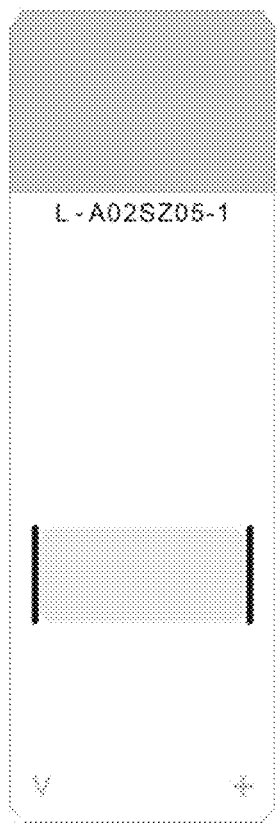 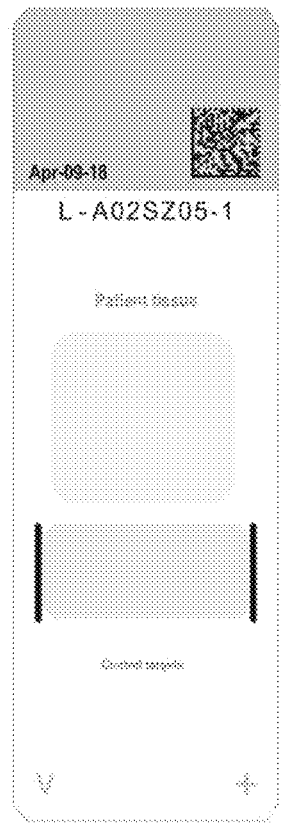 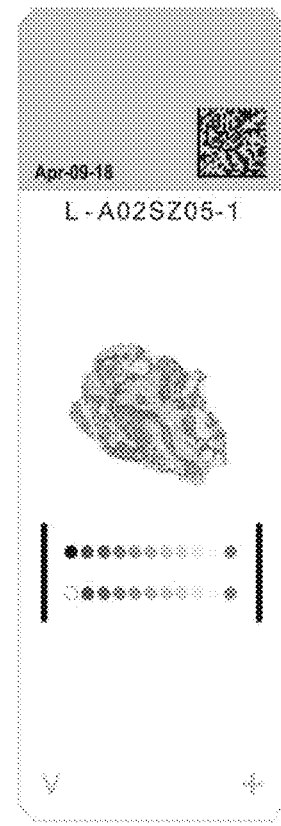
Figure 4A      Figure 4B      Figure 4C

PARAFFIN SHIELD COATING FOR MICROSCOPE SLIDE

PRIORITY CLAIM

This application is a continuation of PCT/CN2018/091383, filed Jun. 15, 2018, which claims the priority of U.S. Provisional Application Nos. 62/520,169 and 62/520,319, both filed Jun. 15, 2017; and is a continuation of PCT/CN2018/091685, filed Jun. 15, 2018, which claims the priority of U.S. Provisional Application No. 62/520,178, filed Jun. 15, 2017; and is a continuation of PCT/CN2018/091686, filed Jun. 15, 2018, which claims the priority of U.S. Provisional Application Nos. 62/520,169, 62/520,178, 62/520,187, 62/520,319 all filed Jun. 15, 2017 and 62/539,281 filed Jul. 31, 2017; and is a continuation of PCT/CN2018/091687, filed Jun. 15, 2018, which claims the priority of U.S. Provisional Application Nos. 62/520,169, 62/520,178, 62/520,334 and 62/520,341, all filed Jun. 15, 2017; and is a continuation of PCT/CN2018/091689, filed Jun. 15, 2018, which claims the priority of U.S. Provisional Application Nos. 62/520,187 and 62/520,319, both filed Jun. 15, 2017, all of which are incorporated herein by reference in their entireties.

FIELD

The present invention relates to a shield coating on a microscope slide. The present invention particularly relates to an application of a paraffin layer to shield biomaterials and inorganic chemical deposits from microbial attack and oxidation. More particularly, the present invention relates to the application of a paraffin layer on a microscope slide as an exposure shield over deposited biomaterial reactive targets. The paraffin shield layer blocks the biomaterial and chemical targets from exposure, which may lead to degradation due to oxidation and provides resistance to fungal growth, while using the existing stain processing steps to remove the paraffin from the shield and co-resident tissue section.

The present invention relates to a microscope slide with integrated targets. The present invention particularly relates to the microscope slide with integrated black and white targets. The microscope slide as disclosed in the present invention with integrated black and white target enables the digital imaging on different systems to be able to set the illumination level so that the process control target arrays and co-resident tissue can be used together and yield similar results.

The present invention relates to a novel process record slide. The present invention particularly relates to a process record slide and a method for Immunohistochemical Staining. More particularly, the invention discloses a process record slide which provides co-resident patient sample with control target that experiences the staining process together. Upon the staining, the stained control immediately exhibits the possible error(s) if any, as deviation against a known target baseline. The aforementioned process record slides deliver a highly effective QC with high accuracy and precision at a cost effective price, with easy acceptance threshold.

The present invention relates to a process record slide for special staining. The present invention particularly relates to the process record slide for Hematoxylin and Eosin, Urine, and Papinocolaou staining. More particularly, the present invention relates to the process record slide for special staining incorporating co-resident stain performance targets with tissue sections or loose cells so that the quality control of the staining process is recorded and that the hematoxylin reactivity is objectively measured. The stain performance becomes permanently locked with the co-resident tissue section or loose cells to support process QC and digital imaging of the stained results.

The present invention relates to a method for IHC antigen imaging scale extrapolation. The present invention particularly relates to a method by which an antigen concentration scale is developed from a known gradient density target series of secondary mammal IgG blood serums and optionally antigen concentrations. The primary application of the aforementioned method is to support image analysis on the slide with a target protein concentration scale. The method is used to form a primary antigen concentration scale from a secondary protein concentration scale. The primary antigen concentration scale is then applied to the co-resident tissue section to access the tissue section for detected cellular defects, such as cancer.

BACKGROUND

Paraffin wax in general, is a white or colorless soft solid, derived from petroleum, coal or oil shale, which consists of a mixture of hydrocarbon molecules containing between twenty and forty carbon atoms. It is solid at room temperature and begins to melt above approximately 37° C. (99° F.); its boiling point is >370° C. (698° F.). Common applications for paraffin wax include lubrication, electrical insulation, and candles; dyed paraffin wax can be made into crayons. It is distinct from kerosene and other petroleum products that are sometimes called paraffin.

In a pathology laboratory, paraffin wax is used to impregnate tissue prior to sectioning thin samples of tissue. Water is removed from the tissue through ascending strengths of alcohol (75% to absolute) and the tissue is cleared in an organic solvent such as xylene or one of the aliphatic substitutes, such as Xylol. The tissue is then placed in paraffin wax for a number of hours and then set in a mold with wax to cool and solidify; sections are then cut on a microtome.

The embedding of tissue sections into paraffin is a routine practice for the preservation of the tissues sections for a prolonged period of time. However, the application of paraffin as a thin coating layer on a selected area of a microscope slide has not been reported. The selected area may contain proteins, conjugated proteins, antibodies, beads coated with peptide strands or proteins, or other cellular materials. Paraffin is inherently known as containing anti-fungal and antibacterial agents which prevent the oxidation of the antigen sites and air borne acid/base degradation of the exposed sites. The paraffin shield coating changes the viable life of the biomaterial and chemical targets from 3-5 days to 1-2 years enabling useful product life for the end user. Removal of the embedding paraffin is also routine practice in order to expose the tissue section to subsequent Immunohistochemical (IHC) or Hematoxylin and Eosin (H&E) staining. Utilizing the same or similar paraffin formulation to shield other deposited materials on the same microscope slide ensures that no additional slide processing must take place before beginning the IHC or H&E staining.

Reference may be made to CN204790174 (U) which discloses a paraffin seal in place of a cover slip for sealing two entrances to a buried chamber within a glass slide. The sealed chamber enables close microscopic examination of a sample without risk of it being damaged by the microscope optics or other handling. Such implementation does not support encapsulation of the biomaterial directly or IHC processing, specifically the deparaffinization of the tissue section.

In the classic fashion an imaging system is calibrated against standard white and black targets by adjusting the illumination source intensity and contrast. Both are to be non-reflective in surface finish. The accepted baseline white reference is a freshly pressed barium sulfate tablet, as established for use with the MacBeth PCM II. Black is generally provided by a void that prevents reflected light from returning to the imaging device.

The white target will be some sort of metal oxide which will stain with exposure to eosin unless the oxide surface is protected. While a black target could be printed containing a carbon compound it will have some amount of 1st surface reflection and thus not be a perfect black. However, it will be black enough relative to any staining that could occur with the biomaterials.

Many imaging systems incorporate white and black void reference targets which are used to set the illumination level prior to the introduction of the object to be imaged. While providing the widest range, the dynamic range on the slide is less than 50% of ideal.

The inconsistency for producing the same results between slides with passage of time and differing stain experience is the major disadvantage of processing imaging baseline on the microscope slide.

It is therefore the object of the present invention to integrate the black and white reference targets on the slide itself. As a result, the imaging reference is a part of the slide and can ensure close results between different imaging systems.

All of the immunohistochemistry methods, as well as other immunochemical methods, are multi-step procedures which consist of a sequence of reagent exchanges, incubations, and washings. Most of these procedures require highly trained personnel and the results can vary significantly between laboratories. Automated systems have been explored to introduce cost savings, uniformity of slide preparation, and reduction of procedural human errors.

For both automated and manual methods, there are a number of critical points to be considered. Care must be exercised to avoid the loss of specimen from the slide. Thorough washing of the specimen between reagent applications is essential particularly to remove unbound antibody as residues would be amplified. Excess liquid must be removed to avoid carryover of the previous reagent and/or unwanted dilution of the subsequent reagent, yet specimens must never be allowed to dry out. Enough antibody reagent must be applied to completely cover the slide area where the specimen may occur, but waste has to be kept to an absolute minimum.

In addition, many of the reagents used in immunohistochemical methods as well as immunochemical methods, such as enzyme solutions and peroxidase color development reagents, have limited stability at the working temperature and even at room temperature. This necessitates frequent preparation of the reagents. Furthermore, nonspecific antibody binding, leading to erroneous results, remains a problem.

Methods and reagents that improve results and minimize reagent preparation would facilitate both manual and automated immunohistochemical methods. Many of the improvements could be readily applied to related immunochemical methods such as enzyme-linked immunosorbent assays (ELISA), immunofluorescence assays and in situ hybridization.

Reference may be made to "Use of cultured cells as a control for quantitative immunocytochemical analysis of estrogen receptor in breast cancer. The Quicgel method" which discloses that the variation in tissue fixation, processing, and staining is largely responsible for poor reproducibility of estrogen receptor (ER) immunohistochemistry assays. A frozen, agar-suspended pellet of MCF-7 cells with known ER content was added to each of 55 samples of invasive breast carcinoma (IBC), serving as a control. Image analysis determined percentages of positive area (positive nuclei per total nuclei analyzed) and positive stain (sum of optical density of the positive nuclear area divided by sum of the optical density of all nuclei studied) of MCF-7 cells and IBC. MCF-7 cells had a mean value of 150 fmol/mg of ER by dextran-coated charcoal analysis. Image analysis of MCF-7 cells included with the 55 cases showed a mean positive area of 70.81. Positive staining from the IBC cases ranged from 0 to 98.5. By using the known ER content and the positive area of the MCF-7 cells, a conversion factor was used to translate the positive area of the clinical specimens to a femtomole equivalent, which for the 55 IBCs ranged from 0 to 1,790 (mean, 187). Inclusion of a control with known femtomole quantity of ER provides an internal standard for quality control and ER quantitation.

Reference may be made to CN102435728, which discloses a preparation method for a positive control substance for the inspection and control of quality in the immunohistochemical process. The method includes the following steps polypeptide or protein with different concentrations which can carry out specific reaction with an antibody are adsorbed on a slide in advance, or polypeptide or protein with different concentrations are placed on the slide in advance, the polypeptide or protein and a pathologic tissue section undergo a conventional immunohistochemical step at the same time, and the coloration result of the polypeptide or protein is used as positive control for the immunohistochemical process. The invention adopts the method of arranging the positive control protein or polypeptide on the slide to realize the positive control and a quality control standard, and the method is an important supplement to the existing quality assurance program, and is a new method for the quality control of immunohistochemical assays.

Following issues have been reported by the above invention which are listed below:

a. The target density will be inconsistent because of the binding of the peptide segments to the dextran polymer depends on the viscosity of the mixing solution, washing of excess peptides out of the dextran, and temperature and the size of the precipitated polymer pellet will vary as a function of the bath concentration, reaction temperature, and reproducibility of the NaOH injection.

b. Building targets of known reactivity (stain density) is limited because the concentration of available peptides on the polymer pellets is unknown. The result is only a yes/no primary antibody detector.

c. While the dextran can support capture of proteins for secondary IgG targets it is limited to yes/no result. Thus, a baseline detection ruler cannot be established to support digital imaging.

d. Targets will leak proteins/peptides during antigen retrieval onto the remaining slide and tissue section. The targets are placed above the tissue section so during processing there will be background and tissue contamination from the targets.

Reference may be made to Horizon Diagnostics that makes a similar control slide to CN102435728, but the targets are constructed very differently. The targets are made from tissue cultured cell lines that have their DNA modified to place the desired antigen peptides natively with the cell. These cell lines can be replicated as desired and are termed as a 'renewable resource'. The cells are fixed in formalin and paraffinized into a tissue block as a loose cell slurry. In use, the targets can include non-reactive cells to produce a mixture of positive and negative reactive targets within the same section. To produce the target array, each cell group can be formed as a cylinder core aligned with other cores, and the entire array is cut as a single section for application to the slide.

Following issues have been reported by the above invention which are listed below:

a. The control is limited to a yes/no result simply because there are too many unknowns with the reactive target site density. Simply stated: by changing the sectional slice through a cell, the stain intensity result will change. Since the cell blocks must go through the antigen retrieval process, whatever antigen presence will be affected by the experience resulting in an unknown variable.

b. Forming a known mix of cells (antigens vs. blanks) is not statistically valid when cutting a section as the electrostatic charge on the cells will be different, causing them to disassociate and bunch like to like. Thus, section to section through the cell block will be variable in ratio making the generation of an antigen density scale improbable.

c. There is inconsistent cell line performance since the cell reproduction has a limited replication life. There can be no assurances that a new cell line will have the same antigen density as any previous cell line.

d. It is not cost effective because of the manual labor effort to construct the tissue block, section the block, and apply cut section to the slide.

Reference may be made to US2016/0274006A1 which discloses a method and apparatus that serve as a control and calibrator for assays performed on cells and tissues mounted on a microscope slide. The apparatus comprises a quality control moiety, such as a peptide epitope, linked to a particulate object, such as a clear spherical bead and the bead is preferably approximately the size of a cell. The quality control moiety is designed to behave in a similar manner in the assay as an analyte, yielding a positive assay reaction. The bead is retained on a microscope slide during the steps of staining by a novel liquid matrix, which solidifies upon drying and causes adherence of the beads to the microscope slide.

This control and calibrator solution, while interesting, is impractical for actual use as stability of the targets to the substrate is weak and the target data is difficult to extract since the target material is on coated beads that are sparsely located. When imaging a single bead, the stain color changes from the top center of the bead to the bead's rim, thus it is hard to know at what point on the surface of the bead the image data is correct.

Reference may be made to U.S. Pat. No. 7,271,008B2 which discloses a device and methods for determining the quality of reagents used in an assay process, particularly a multistep immunohistochemical assay. In particular, the device comprises a substrate with a plurality of compounds affixed to a substrate, where each compound is reactive with a reagent used in the assay.

The Immunostaining disclosed in the above patent document is intended as a quality control slide to evaluate the behavior of secondary stain kits rather than support a tissue section going through IHC processing. The slide substrate was amino-silane which could not support covalent bonds capable of going through the antigen retrieval processing for any of the targets. Additionally, the Alkaline Phosphatase target would breakdown with exposure to the antigen retrieval temperatures.

Hematoxylin and Eosin (H & E) staining is the most common staining technique in histopathology. This uses a combination of two dyes, Hematoxylin and Eosin used for demonstration of nucleus and cytoplasmic inclusions in clinical specimens.

The staining method involves application of hemalum, a complex formed from aluminum ions and hematein (an oxidation product of hematoxylin). Hemalum colors nuclei of cells (and a few other objects, such as keratohyalin granules and calcified material) blue. The nuclear staining is followed by counterstaining with an aqueous or alcoholic solution of eosin Y, which colors eosinophilic structures in various shades of red, pink and orange.

The staining of nuclei by hemalum is ordinarily due to binding of the dye-metal complex to DNA, but nuclear staining can be obtained after extraction of DNA from tissue sections. The mechanism is different from that of nuclear staining by basic (cationic) dyes such as thionine or toluidine blue. Staining by basic dyes occurs only from solutions that are less acidic than hemalum, and it is prevented by prior chemical or enzymatic extraction of nucleic acids. There is evidence to indicate that coordinate bonds, similar to those that hold aluminum and hematein together, bind the hemalum complex to DNA and to carboxyl groups of proteins in the nuclear chromatin.

The eosinophilic structures are generally composed of intracellular or extracellular protein. The Lewy bodies and Mallory bodies are examples of eosinophilic structures. Most of the cytoplasm is eosinophilic. Red blood cells are stained intensely red.

The structures do not have to be acidic or basic to be called basophilic and eosinophilic; the terminology is based on the affinity of cellular components for the dyes. Other colors, e.g. yellow and brown, can be present in the sample; they are caused by intrinsic pigments, e.g. melanin. Some structures do not stain well. Basal laminae need to be stained by PAS stain or some silver stains, if they have to be well visible. Reticular fibers also require silver stain. Hydrophobic structures also tend to remain clear; these are usually rich in fats, e.g. adipocytes, myelin around neuron axons, and Golgi apparatus membranes.

The Pap smear test is done on women at various intervals depending upon their age to perform cervical cancer screening. The frequency increases to yearly for women older than 50 in most parts of the world.

The Pap smear test is not fully standardized in the composition and timing of the dyes used, ratios, and timing. The Pap staining involves five dyes that are mixed into three solutions. The three solutions are: a nuclear stain, first counter stain, and second counter stain.

It is therefore an object of the present invention to provide a system which incorporates the co-resident targets with the tissue sample or loose cells. Preferably, the aforementioned targets have the following attributes: chemical molecules that are covalently bound to the slide and will covalently capture the stain molecule. The present invention provides as effective solution for the above mentioned problem by providing a process record slide with co-resident targets that are covalently bound to the slide adhesive and will covalently capture the stain molecule.

Immunoassays are used when an unknown concentration of an analyte within a sample needs to be quantified. To obtain the most accurate determination of the unknown concentration, an immunoassay must be developed based not only on the usual assay development criteria (standard deviation or optimal signal window) but also on how well the immunoassay can predict the value of an unknown sample. First, one needs to establish the assay critical success factors. Then the immunoassay needs to be developed, which establishes proof of concept. During the optimization phase, the quantifiable range of the immunoassay method is determined by calculating a precision profile in the matrix in which the experimental samples will be measured. A spiked recovery is then performed by spiking the analyte into the matrix and determining the percent recovery of the analyte in the matrix. If the precision profile is within the desired working range, then assaying spiked recovery samples over several days completes the validation of the immunoassay. If the precision profile limits are not within the desired working range, further optimization of the immunoassay is required prior to validation.

The primary application of the method disclosed in the instant application is to support image analysis on the slide with a target protein concentration scale. The present invention discloses a method which is used to form a primary antigen concentration scale from a secondary protein concentration scale. The primary antigen concentration scale is then applied to the co-resident tissue section to access the tissue section for detected cellular defects, such as cancer.

SUMMARY

Generally, in one aspect of the present invention is the application of a paraffin coating over biomaterial and inorganic targets.

In another aspect of the present invention, the biomaterial and inorganic targets are deposited onto microscope slide wherein the paraffin coating is selectively applied to cover just past the deposits as a shield.

In yet another aspect of the present invention, the resultant coated microscope slide is post heated to melt and/or blend paraffin particles into monolithic surface coating sealing both the deposits and the slide surface surrounding the deposits.

In still another aspect of the present invention, the paraffin coating may be applied by spray coating, screen printing, ink jet methods, pad printing, and roller transfer printing etc.

In still another aspect of the present invention, the paraffin coated increases the shelf life of the tissue sections by preventing the oxidation of the antigen sites and air borne acid and or base degradation of the exposed sites.

Other aspects of the present invention are disclosed in the following description.

Generally, in one aspect of the present invention discloses a microscope slide with integrated black and white targets ensures that digital imaging on different systems will be able to set the illumination level so that the process control target arrays and co-resident tissue section can be used together and yield similar results.

In another aspect, the present invention discloses that the white targets will not be perfect it will represent the whitest object on the slide.

In yet another aspect, the present invention discloses the black targets sets the dynamic range for the camera.

In still another aspect, the present invention discloses that the co-resident targets are included among the microscope slide to provide objective values by which the stain specific targets and the tissue section itself can be evaluated against.

Other aspects of the present invention are disclosed in the appended drawings and the following description.

Generally, one aspect of the present invention provides a process record slide for immunohistochemical staining.

In still another aspect of the present invention provides a device and methods for determining the efficacy of paraffin removal, antigen retrieval and the primary and secondary stain reagent used in an assay process particularly a multi-step immunohistochemical (IHC) assay.

In yet another aspect, the present invention provides a device that encompasses an adhesive coated microscope slide containing a plurality of compounds applied as dots in 2D or 3D configuration and sealed under a paraffin coating.

In another aspect, the present invention provides a process record slide wherein the tissue section or loose cells are subsequently applied to the same slide and all experience the IHC processing steps from tissue capture through application of a coverslip.

In yet another aspect, the present invention provides a process record slide wherein the compounds react with either the primary or secondary IHC stain reagents to record the processing experience of the co-resident tissue section or loose cells.

In still another aspect, the present invention provides a process record slide wherein the primary targets are composed of conjugated antigens on carrier proteins.

In another aspect, the present invention produces a process record slide wherein the primary targets are composed of conjugated antigens on carrier proteins which are blended with other carrier proteins conjugated with different antigens to form targets with multiple capture capability. Only one can be used at a time, but the method expands the number of the primary targets past the physical number of primary targets on the slide.

In yet another aspect, the present invention produces a process record slide wherein the primary targets are composed of conjugated antigens on carrier proteins which are blended with other non-reacting proteins to produce a gradient density array all of the same antigen.

In another aspect, the present invention provides a process record slide wherein two arrays of secondary targets are used, wherein one array is Mouse and the other array is Rabbit.

In yet another aspect, the present invention provides a process record slide wherein the secondary array are applied to the substrate as 2D gradient density arrays from 10%-100% concentration along with the 2D/3D 100% concentration target.

Specifically, in accordance with the present invention there is provided a process record slide wherein the extrapolation of the secondary arrays and aided, if available, by the primary array to develop a scale or ruler to objectively measure each antigen concentration on the co-resident tissue section. The IHC stain experience becomes permanently locked with the co-resident tissue section or loose cells to support QC of the IHC process and objective measure of the antigen density.

Particularly, the present invention includes the following embodiments:

1. A process record slide for Immunohistochemical staining comprising:

Optionally, a marking on the top of slide label area which identifies the slide type and a code that identifies the antigens supported by the primary targets;

Optionally, a lot number just below the label printed on the slide;

a space for a tissue section to be applied for processing through IHC and subsequently for examination;

IHC targets located below the tissue section;

an imaging reference dot located at either side of the protein array; and optionally a glass microscope coating.

2. The process record slide according to embodiment 1 wherein the combination of targets can be secondary alone, secondary plus antigen retrieval monitor, or secondary plus antigen retrieval monitor plus primary antigen.

3. The process record slide according to embodiment 1 wherein the tissue section may be applied to said space for the tissue section selected from any biological origin.

4. The process record slide according to embodiment 1 wherein the secondary IHC 2D targets are composed of 4% mixture of formalin and (a) Mouse and Donkey proteins to form a gradient density series from 100 to 10% Mouse concentration and (b) Rabbit and Donkey proteins to form a gradient density series from 100 to 10% Rabbit concentration.

5. The process record slide as described in embodiment 1 wherein the secondary IHC 3D 100% targets are formed of a mixture of a polysaccharide as a skeleton and the 100% mixture of embodiment 4A (a) Mouse protein and (b) Rabbit protein.

6. The process record slide as described in embodiment 1 wherein the extended antigen retrieval monitor targets are a 50:50 blend of 100% Mouse and Rabbit proteins that are deposited in two configurations: (a) 2D with a 2% formalin fixation and (b) 3D with a polysaccharide and over fixed with 6% formalin.

7. The process record slide as described in embodiment 1, wherein the primary IHC 2D targets are antigen peptides covalently attached to a carrier protein, such as keyhole limpet clam (KLH), which can be mixed with a neutered KLH protein and 4% formalin to make a gradient density series of three to five dilutions or mixed with different antigen attached KLH proteins to form multi-antigen targets.

8. The process record slide according to embodiment 1, wherein the imaging reference dot is a black and white imaging reference.

9. The process record slide according to embodiment 1, wherein the glass microscope slide coated with an bioadhesive which is covalently attached to the glass and conformal with reactive end groups that is selected from the group consisting of amine, amide, carboxyl, and hydroxyl; and is slightly hydrophilic, such as the Thermo-Fisher SuperFrost Plus #GL4951P.

10. The process record slide according to embodiment 1, wherein the targets are co-resident target with the tissue section.

11. A method for immunohistochemical staining with process record slide according to embodiment 1 comprises the following steps of:

a. removing paraffin from the paraffin embedded tissue section and the paraffin shield coating over the PRS targets;

b. removing formaldehyde fixing to expose antigen sites of the tissue section by antigen retrieval buffer';

c. applying one or two primary conjugated antibody to bind to any matching antigen sites found in either the tissue section or primary antigen target sites;

d. applying stain reagents to the exposed antigen sites obtained in step (b) to produce a visible colour indication of the targeted antigen's presence;

e. optionally, a multistep amplification step to obtain sufficient density of the colorant;

f using hematoxylin to provide a contrast color (blue) to make visible the physical morphology.

g. covering the slide with coverslip which is eventually ready for the examination.

12. The method according to embodiment 11 wherein the removal of paraffin in step (a) is carried out by warming the paraffin at a temperature ranging between 65 and 75 degrees C. for 3-10 minutes to obtain a semi-liquified state of paraffin followed by liquifying with an organic solvent series until rehydrated in a buffer solution.

13. The method according to embodiment 11 and 12 wherein the organic solvent is selected from a series of solvents starting with an aliphatic solvent, such as xylene or xylol, anhydrous ethanol, 95% ethanol, 70% ethanol, 50% ethanol, and a salt-based buffer solution each with a exposure time of nominally 3-minutes.

14. The method according to embodiment 11, wherein the fixation of formaldehyde may be removed by an antigen retrieval process, such as: heat induced epitope removal (HIER) process or by longer warm distilled water, with many water exchanges, antigen retrieval process.

15. The method according to embodiment 11, wherein the secondary stain reagent utilized in step (d) can be selected from enzyme-labeled secondary, enzyme-labeled tertiary antibody reacts with enzyme-labeled secondary antibody, APAAP immune complex reacts with secondary antibody, enzyme-labeled (strept)avidin reacts with the biotinylated secondary antibody, avidin- or strept-avidin-biotin-enzyme complex reacts with the biotinylated secondary antibody, strepavidin-enzyme complex on biotinylated secondary antibody on primary antibody, and polymer containing secondary antibodies and enzyme sites bound to primary antibody.

16. The method according to embodiment 11, wherein the antigen retrieval buffer utilized may be selected from a pH range of 6 to 9.

17. The method according to embodiment 11, wherein the primary antibodies in step (c) is selected from antibody whose host protein is either Mouse or Rabbit, to include as common examples: ER, PR, Her2, Ki67.

18. The method according to embodiment 11, wherein said chromogens may be selected from 3,3'-Diaminobenzidine (DAB), Amino-9-ethyl carbazole (AEC), DAB+Nickel enhancer, Fast Red, TMB, StayYellow, BCIP/NBT, BCIP/TNBT, Naphitol AS-MX phosphate+Fast Blue BB, Naphihol AS-MX phosphate+Fast Red TR, Naphitol AS-MX phosphate+new fuchsin, StayGreen, and NBT 19. The method according to embodiment 11, wherein said method is cost effective, reproducible. stable, aids in identification of IHC processing steps that lead to misdiagnosis.

20. The method according to embodiment 11, wherein said method is utilized as a quantitative standard for process control to antigen concentration on the co-resident tissue section or loose cells.

Generally in one aspect of the present invention, a process record slide is disclosed with an array of inorganic targets each reactive to a single stain used as part of H&E and PAP staining and covalently bound to the slide, preferably to the slide's adhesive coating; wherein the stains are Hematoxylin+Mordant, Eosin Y as the first array of targets and Orange G, Phosphotungstic acid, Light Green SF or Fast Green FCF, and optionally Bismarck Brown or one to seven Special Stains as the second array of targets; and the mating inorganic targets that support a unique binding with H&E stains and a group of Special Stains with an opposing hydroxyl to covalently bind with the slide's adhesive coating.

In another aspect of the present invention, the slide contains an adhesive coating (as mentioned above) to secure the tissue section or loose cells for processing. The most common adhesive slide used for this application is coated with amino-silane and is produced by most all glass slide manufacturers. The amine group will provide a covalent bond to hydroxyl end groups that is stable through 85° C.

In another aspect of the present invention, the mating inorganic targets are: Sodium 4-hydroxybenzenesulfonate, Hydroquinone, Isobutanol, Phenolsulfonic acid, and p-Toluene Sulfonyl Chloride, and a blend of Polyphosphoric acid and Polyvinylalcohol.

In yet another aspect of the present invention, the hematoxylin target is a two, three or more-member gradient density blend of polyphosphoric acid and polyvinylalcohol, preferably, the gradient density comprises stepped dilution increments of 1 to 1000:1, more preferably, the gradient or series dilutions follows a −20 log (dilution) profile. Explanation: The −20 log (dilution) has the same meaning with dBd, that changes what is a log curve into a linear slope, which makes applying the impact of dilutions and processing reactions easy as they become linear actions throughout the dynamic range of the targets. The terms −20 log (dilution) and dBd both refer to describing the dilutions on a semi-logarithmic basis in order to linearize the data so that modifying terms can be easily applied. The term (dilution) refers to the dilution X where X is [1 . . . 1000] equating to 1:1 to 1,000:1. The term dBd may be defined as decibels of dilution or the dilution strength.

In still another aspect of the present invention, the Special Stain targets include, but are not limited to: Sodium 4-hydroxybenzenesulfonate, Hydroquinone, Isobutanol, Phenolsulfonic acid, p-Toluene Sulfonyl Chloride, a blend of polyphosphoric acid and polyvinylalcohol, and others using a hydroxyl end group that is covalently bound to the slide's adhesive coating.

In another aspect of the present invention, the H&E targets can be used to access the condition of both the Esoin Y and Hematein+Mordant stain reagents for quality control and color correction in the captured digital image.

In another aspect of the present invention, a process record slide containing an array of inorganic targets each reactive to a single stain used as part of Pap smear staining and covalently bound to the slide's adhesive coating.

Other aspects of the present invention are disclosed in the appended drawings and the following description.

Generally, in one aspect of the present invention provides a method for IHC antigen imaging scale extrapolation.

In another aspect of the present invention, the invention discloses a method by which an antigen concentration scale is developed from a known gradient density target series of antigen concentrations and secondary mammal IgG blood serums.

In yet another aspect of the present invention, the primary application of the aforementioned method is to support image analysis on the slide with a target protein concentration scale.

In still another aspect of the present invention, the method is used to form a primary antigen concentration scale from a secondary protein concentration scale.

In yet another aspect of the present invention, the primary antigen concentration scale is then applied to the co-resident tissue section to access the tissue section for detected cellular defects, such as cancer.

Other aspects of the present invention are disclosed in the following description.

BRIEF DESCRIPTION OF DRAWINGS

FIG. 1 is a cross section view of the selectively applied paraffin shield layer over the biomaterial and chemical deposits showing how the paraffin ensures a seal at the edges of its deposit. The paraffin has been melted after being deposited to drive out the solvent needed to make the paraffin liquid and seal the edge to the slide and/or slide adhesive coating.

FIG. 2 illustrates a slide for H&E usage that contains black and white imaging targets on the same line as the chemical targets reactive to Hematoxylin and Eosin Y stains and illustrates the architecture of the process record slide for H&E staining in accordance to the one embodiment of the present invention. The black target is at the right and the white target is on the right. Three images are shown for the same slide: left is the slide before the application of tissue sections, the center has three tissue sections applied, and the right is the slide after being stained. The grayed out zones represent a paraffin shield over the targets or captured formaldehyde fixed tissue sections.

FIG. 2A shows the H&E slide as manufactured. The slide has the minimal ID via the lot code number with a blank area in the painted label area. There are two thick painted long axis bars that extend beyond the area of the target dots. The bars are a recent addition to address how the label printers dispense slides from the bottom of a stack. The bars ensure that the stack of slides above do not damage the slide coating and more importantly the paraffin shield coating and the targets dots below the paraffin.

FIG. 2B shows the H&E slide with patient tissue sections applied. In this case there are three sequential replicate sections, but the sections could be spaced further apart as done in evaluating the excising of skin cancer, typical in MOHS surgery. The gray text is there just to identify what the paraffin areas are, but does not exist on the actual slide.

FIG. 2C shows the H&E slide after being stained. Both the targets and tissue sections are now visible and ready for interpretation.

FIG. 3 represents the varieties of primary and secondary targets that may be utilized in accordance with one embodiment of the present invention, and shows a representation of the portion of a slide containing the primary and secondary stain capturing targets after IHC staining with identification of the different targets.

FIG. 4A shows the Essential slide as manufactured. The slide has the minimal ID via the lot code number with a blank area in the painted label area. There are two thick painted long axis bars that extend beyond the area of the target dots. The bars are a recent addition to address how the label printers dispense slides from the bottom of a stack. The bars ensure that the stack of slides above do not damage the slide coating and more importantly the paraffin shield coating and the targets dots below the paraffin.

FIG. 4B shows the Essential slide as it appears after the slide has had its accessioning data printed in the label area: date and 2D bar code and a tissue section has been captured. Notice that the tissue section appears as just as more of the paraffin wax. The tissue is largely transparent so the paraffin color dominates. The 'patient tissue' and 'Control targets' text is not printed on the slide, but is there to guide the reader what the paraffin covered areas are.

FIG. 4C shows the Essential as it appears after the IHC processing. Both the targets and the tissue section are now visible and ready for interpretation.

FIG. 8 illustrates the architecture of the process record slide for PAP smear staining in manual smear mode in accordance to the one embodiment of the present invention.

FIG. 9 illustrates the architecture of the process record slide for PAP smear staining where automated processing of the sample removes mucus and red blood cells, placing the cleaned sample into a hydrophobic ring in accordance to the one embodiment of the present invention.

DETAILED DESCRIPTION

Figure 5:
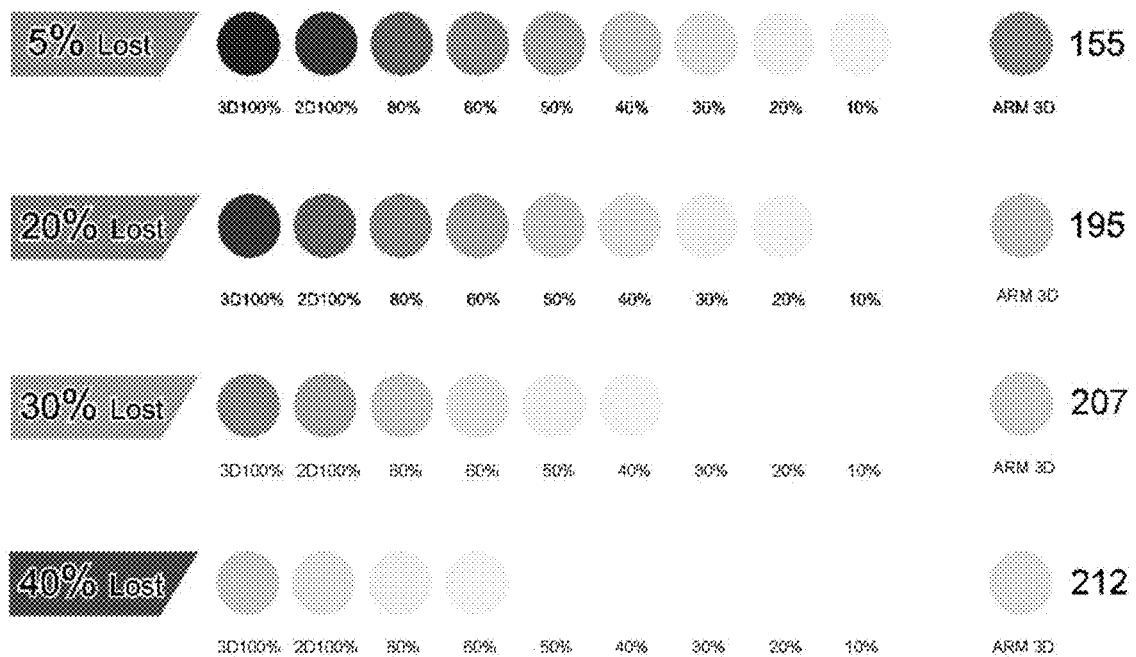
FIG. 5 is a close representation for the effect of AR damage, shows the effects of antigen retrieval processing upon one of the secondary protein arrays after IHC staining.

The present invention may be understood more readily by reference to the following detailed description, which forms a part of this disclosure. It is to be understood that this invention is not limited to the specific devices, methods, conditions or parameters described and/or shown herein and that the terminology used herein is for the example only and is not intended to be limiting of the claimed invention. Also, as used in the specification including the appended claims, the singular forms 'a', 'an', and 'the' include the plural, and references to a particular numerical value includes at least that particular value unless the content clearly directs otherwise. Ranges may be expressed herein as from 'about' or 'approximately' another particular value, when such a range is expressed another embodiment. Also, it will be understood that unless otherwise indicated, dimensions and material characteristics stated herein are by way of example rather than limitation, and are for better understanding of sample embodiment of suitable utility, and variations outside of the stated values may also be within the scope of the invention depending upon the particular application.

This invention is not in its application limited to the details of construction and the arrangement of components set forth. In the following description or illustrated in the following description or illustrated in the drawings. The invention is capable of other embodiments and of being practiced or of being carried out in various ways. Also, the phraseology and terminology used herein for the purpose of description and should not be regarded as limiting. The use of "including", "comprising", "having", "containing", "involving", and variations thereof as well as additional items.

Reference will now be made in details to the preferred embodiments of the present invention.

Tissue blocks and sections cut from the tissue block are infused with paraffin that completely replaces the water content of the tissue's cellular structure. The paraffin inherently does not support bacterial and fungal growth, which ensures long term stability of the embedded biomaterials.

Target proteins deposited onto a microscope slide, glass or plastic, present a rich food source to bacteria or fungal antagonists. Additionally, the protein's antigen sites are susceptible to oxidation that effectively neutralizes the ability to bind detection antibodies to the protein. Many of the subsequent reaction binding sites are hydroxyls, which can become damaged through reactions with airborne acids and bases. Typically, slides containing protein deposits are stored at temperatures below what supports microbial growth. However, such a constraint limits the effective utilization of deposits. Additionally, the protein deposited slides are packaged in vacuum sealed containers to prevent oxidation damage. Unprotected protein deposited slides have an open-air shelf life between 2 and 5 days depending upon ambient temperature and airborne contaminate levels.

Targets that react uniquely with the chemical structure of inorganic stains are also susceptible to oxidation and reaction with airborne materials. Such stain reactant targets include those for Hematoxylin, Eosin, and most of the special stains group. The targets for these stains are designed to react singularly with but one stain. Biological targets do not, for the most part, provide for such singularity but chemical constructs can. Therefore, the present invention provides a solution by providing a method for selectively coating the biomaterials as well as targets to shield them from any kind of degradation on any kind of microscope slide.

In one embodiment of the present invention, the paraffin is blended with a solvent to change the material state from solid to a liquid at room temperatures. The blend uses Paraplast X-tra or equivalent with Xylene or a Green Xylene replacement: an Aliphatic solvent, for example Xylol to reduce the viscosity and slow down solidification following deposition. In another embodiment, the solvent may be selected but not limited to toluene, paint thinner, turpentine, or a 50:50 mix of acetone & kerosene.

In another embodiment, the solid paraffin is melted at no more than 75° C. above the paraffin melt temperature until liquid, then slowly add an Aliphatic solvent until the saturation point is observed (solids are formed). Allow the mixture to cool to 45° C. and slowly add more Aliphatic until it is completely clear.

In another embodiment, the aforementioned paraffin coating applied over biomaterial and special stain reactive deposits previously applied to an adhesive coated a microscope slide, where biomaterials may include but are not limited to proteins, peptides, conjugated proteins, protein coated beads, peptide coated beads, or conjugated coated beads and the special stain reactive end groups that uniquely capture a special stain material which react with the applied antibody and secondary stain reagents.

In another embodiment, the paraffin layer may be deposited onto the adhesive coated microscope slide which include but are not limited to: spray, inkjet deposit, transfer printing (such as pad printing), screen printing, and vapor deposition. In all deposition methods, the paraffin layer must be less than 5um thick to ensure that during the paraffin removal step of the staining process, all the paraffin (shield and tissue section embedding) can be dissolved and carried away. Independent of the deposition process/method, the criterion of the paraffin is:
  A thin layer, preferably about no thicker than 5 microns,
  Have a melting temperature of less than 60° C. and preferably less than 56° C. and dissolves with exposure to xylene or xylol (aliphatic replacement) solvents, and
  Have ambient temperature hardness similar to the embedding paraffin's.

In another embodiment, the tissue block embedding paraffin materials may include but not limited to TissuePrep & TissuePrep 2 by Thermo Fisher, melting temp 56° C., Paraplast &Paraplast plus by Leica, melting temp 56° C., Paraplast X-tra by Leica, melting temp 50-54° C. Paraplast X-tra specifically incorporates butylated hydroxytoluene, a phenolic antioxidant, to reduce oxidation degradation of protein, peptide, and inorganic targets.

In another embodiment, each is a blend of purified paraffin, synthetic polymers, and other materials to establish the melt temperature, hardness, and viscosity. Inherent to paraffin is non-support of microbial growth.

In another embodiment, the special stains may include but are not limited to: Alcian Blue, Analine Blue—Orange G Solution, Azan Stain, Bielschowsky silver stain, Brow & Benn—Gramm Stain, Cresyl Violet, DAB, Fontana Masson, Gordon and Sweet's silver staining, Grocett's Methanamine silver method, Hall's Bilirubin stain, Jones Methanamine silver method, Luxol Fast Blue, Luxol Fast Blue—Cresyl Violet, Mucicarmine (Mayer's Method), Muller-Mowry colloidal Iron, Orange G, Nuclear Fast Red, PAS with Diastase Digestion, Periodic Acid Schiff (PAS), Phosphotungstic Acid, Haematoxylin, Picro Sirius Red, Toluidine Blue Acidified, Trichrome Gomoris One-Step, Trichrome—Masson's, Victoria Blue, Von Kossa, Weigert's Resorcin Fuchsin, Weigert's Iron Haematoxylin, Zell—Neelsen Method.

In another embodiment, the targets may be selected but not limited to pigment colored deposits such as black and white, but can include any pigment color.

In another embodiment, the microscope slide on which the aforementioned paraffin coat may be applied may be selected from but not limited to glass, plastic or any polymer material. In another embodiment, the paraffin maybe purified and water free.

In another embodiment, the resultant microscope slide may be post heated to melt and/or blend paraffin particles into a monolithic surface coating sealing both the deposits and the slide surface surrounding the deposits.

In yet another embodiment, the resultant microscope slide after the paraffin is deposited to force the solvent out of the paraffin, ensuring that it returns to a hardened state. This must be done from the paraffin side of the slide, preferably using infrared light. Melting the paraffin from the top down ensures that the solvent is able to rise up and evaporate from the paraffin without encumbrance. The result is illustrated in FIG. 1, which shows how the melted paraffin ensures a good seal at the edges of its deposit.

Historically, the results of reference control slides are entirely subjective because there is no inclusion of black and white reference targets the target(s) are inconsistent in density, and unique in reactivity to a single stain reagent. The reference control slide at best has a sausage that contains portions containing known antigen sites. The antigen concentration is unknown so all that can come from the stained slide is that the reagents all appear to be working at enough of a level to signal the antigen presence. In the case of IHC processed slides no objective measure can be performed as because the result is the cumulative product of the antigen retrieval, primary stain reagents, and secondary stain reagents. Therefore, the reference control slide at best simply provides some comfort to the user that all appears to be working.

Digital imaging of microscope slides containing stained biomaterials is evolving to perform prescreening and potentially full diagnostic determination on the stained materials. In general, the imaging system must adjust the illumination light level so that the digital image is not in compression at either the white or black boundaries. The conventional solution is to have black and white targets located where the label is expected to be positioned. The underlying assumption is that the white and black targets represent the extremes that the slide can present. However, in doing so there is compression in the digital scale as the black is much blacker and the white much whiter than can realized by the staining of a tissue section.

In one preferred embodiment of the present invention, a microscope slide is disclosed that incorporates control and reference target standards which are co-resident with a tissue section or loose cell deposit. The reference targets and tissue section record the processing experience between tissue capture and cover slipping of the stained slide.

In another embodiment, amongst the microscope slide target arrays are co-resident black and white reference targets. The black and white reference targets have experienced that same exposure to reagents and processing as the other targets and tissue section.

In another embodiment, the black and white reference targets enable the imaging system to shift the illumination level so that the working range is expanded. Depending upon the biomaterial type the processing experience can change considerably.

In another embodiment, the different processing paths can be grouped as but not limited to ImmunoHistoChemical (IHC), Hematoxylin and Eosin (H&E) plus special stains, Urine smear H&E plus special stains, and Papanicolaou stain (PAP) smear which is composed of five dyes in three solutions.

A pure black deposit target in general, is difficult to produce because, by definition, it must absorb all light. The classic solution is to simply provide a void that folds the light path in such a manner that a reflection cannot be returned. At best a black target will be somewhat reflective, but it is usually good enough as nothing else on the slide will be nearly so black.

In another embodiment, both the targets i.e. the black and white targets are printed paint or ink deposits which are non-reactive to any of the reagents used to process a slide. The white target in an ideal situation would be a perfect white. However, there is very little stained biomaterial usefulness that gets more than halfway from black to white. Thus, the white can be 5-10% away from perfect white and still be of useful value. The main requirement is that the white be of a metal oxide or sulfate composition that is stable with the passage of time when not left exposed to sunlight. Aluminum and Titanium oxides more than meet the requirements.

In another embodiment, the preferred solution to the above mentioned problem is disclosed. The black and white targets are both based on an anhydride based epoxy paint base that is catalyzed by direct UV light exposure at nominally 365 nm. The anhydride catalyzer is composed of methyl tetrahydrophthalic anhydride and diphenyliodonium hexafluroroarsenate. Other than UV initiated, anhydrides require the addition of heat to function in catalyzing the epoxy to cross-link. The preferred UV initiated anhydride and its companion are listed, but there are other solutions possible that can be found when performing a search of anhydride producing companies. While such a paint/ink can be constructed as needed, it is usually a purchased component that has been optimized for the printing method being used. Fabrication of the paint/ink must address the difficulty in achieving good wetting between the pigment particles and the epoxy binder. Anhydride based paints (also called an ink when having low viscosity) often have the anhydride mixed in with the epoxy as the pot life can be many months in duration. To lower the viscosity would be known knowledge of those involved in the printing industry and the formulation varies depending on the surface the epoxy mixture is to applied onto and the printing method used. While heat triggered anhydride-epoxy paint/inks are commonly used, the heat necessary to initiate the reaction can potentially damage biomaterials (proteins, peptide, and chemical targets) that may be co-resident with the paint/ink.

In another embodiment, the anhydride catalyzer eliminates the unreacted amines found with an amino-silane based catalyzer that would otherwise support non-specific staining. Free amine end groups can and will capture both biomaterials and some of the special stains. Specifically, this addresses the issue of undesired staining of the white target by the slide processing reagents, in particular the staining reagents. As a free amine end group on the surface of the paint/ink, it can capture both the primary antibody and secondary stain reagents and become stained. Thus, defeating the value of having an integrated white target on the slide.

In another embodiment, the black pigment uses a carbon dust of less than 2 microns diameter while the white uses aluminum or titanium oxide beads. Titanium oxide is the preferred metal oxide for this application.

In another embodiment, it is well known that in formulating epoxy ink/paint formulations the viscosity and drying time is controlled by various short and long chain alcohols and surfactants. The choice of surfactants can leave the ink/paint reactive to the range of stains and reagents these slides can experience. The preferred formulation avoids surfactants altogether.

In another embodiment, the printing of the targets can be done by pad stamp or syringe with the syringe the preferred method as it supports better feature size control of the target deposition.

In another embodiment, the aforementioned white targets are composed of metal oxide pigments within an anhydride catalyzed epoxy. In another embodiment, the aforementioned black targets are composed of carbon pigments within a UV initiated anhydride catalyzed epoxy. In another embodiment, the anhydride catalyzer is UV initiated by direct UV light exposure. The primary advantage of using the UV initiated anhydride catalyzer is that the heat needed to initiate anhydride-epoxy reaction exceeds what the biomaterials (proteins, peptide, and chemical targets) can tolerate without damage. More importantly is the elimination of any free amines that could react with the stain reagents.

Advantages of the Invention a. The integrated black and white targets are co-resident with a tissue section or loose cells on a microscope slide.

b. The integrated black and white targets are non-reactive to biomaterial stains.

c. The integrated black and white targets are stable through exposure to antigen retrieval activities: buffers, heat, duration and other environmental factors.

d. The integrated black and white targets are non-reactive to hydroxyl, amine, amide, hydrazide, and aromatic benzene compounds. The black/white targets will be exposed to stain reagents that can react with the end groups listed. Thus, to ensure the targets will not stain the end groups must be inherently inert, such as —$CH_3$ or —C=O. For the most part the staining will occur by the special stains reagents that are designed to specifically bind to the end groups listed. For example: Eosin Y binding to metal oxides.

Definition

As used herein, term "slide", also referred to as "microscope slide" means thin flat piece of sheet (usually made of glass, therefore sometimes referred to as "glass slide"), typically 75 by 26 mm (3 by 1 inches) and about 1 mm thick, used to hold objects for examination under a microscope.

The slide in the present disclosure is also referred to as "process record slide (PRS)", which may be interchangeably termed as PRS-IHC slide Term "detection area" as used herein refers to a space in the slide where the specimen such as tissue and loose cells of any biological origin are placed for the subsequent immunohistochemical or immunochemical detection.

Term "control area" as used herein refers to a space which holds the targets of known reactive behavior for evaluating the antigen retrieval status, primary antibody reagent efficacy, and secondary reagent efficacy, including one or more selected from the primary and secondary target arrays, imaging reference and antigen retrieval monitor.

It should be noted that the "detection area" and "control area" may have clear marked boundaries on the slide or not; preferably they are only classified based on their function.

As used herein, term "primary targets" means the target to which the primary antibody for an IHC assay could bind. Also, it could refer to any unspecified antigenic peptide fragments that could be recognized by an antibody. The type of antigenic peptide fragments can be determined by the primary antibody used in the IHC process and subsequently conjugated with carrier protein to get the desired primary target array(s). Or, the primary targets be prepared with common antigenic peptide fragments in advance, for subsequent use.

Term "antigenic peptide fragments" as used herein refer to the full-length or a part of an antigen protein, which has the same or nearly the same antigenic specificity as the antigen protein, as well as halogen.

As used herein, term "secondary targets" means the target to which the secondary antibody used in IHC process binds. Normally, the secondary antibody binds to the primary antibody in IHC, therefore, the secondary target usually comprises IgGs of different origins, such as mouse and rabbit.

Term "host protein" means the protein (especially IgG) which has the same origin as the primary antibody, such as mouse, rat, rabbit and goat protein (IgG).

Term "dummy protein" means the protein that is unreactive to the secondary antibody and used to mix with host protein to get gradient dilutions. Preferred dummy protein is donkey protein (IgG) or horse protein (IgG).

As used herein, term "loading dot" is also interchangeably termed as "dot", which means the entity formed by fixing the desired peptide or protein onto the slide. The "dot" can be of any shape, such as but not limited to circle, ellipse, square, diamond, etc.

Slide

Immunohistochemical (IHC) staining in general, is used to assess the presence of specific antigen sites in a patient tissue section. Subjective interpretation is applied against the stain density on the tissue section to assign the diagnostic level of an abnormal or cancerous condition. In general, there is an assumption that the IHC processing always functions correctly and that the tissue section would be marked with visible chromogen markers identifying the abnormal or cancerous conditions if they are present. However, failure of the antigen retrieval or stain reagents leaves no signature identifying artefacts. Thus, there is considerable opportunity for not being able to render a valid diagnostic determination on the part of the Lab Tech or Pathologist. In other words, the physical morphology may not be enough to signal an abnormal condition, but without the antigen sites being marked, the slide offers nothing more than would be found on a Hematoxylin and Eosin (H&E) slide.

In one embodiment of the present invention discloses a novel adhesive coated side which may be interchangeably termed as the "Process Record Slide" (hereinafter the adhesive coating slide may be termed as the process record slide rendering the same scope and meaning). The aforementioned "Process Record Slide-Immunohistochemical" (PRS-IHC) slide incorporates targets of known reactive behavior for evaluating the antigen retrieval status, primary antibody reagent efficacy, and secondary reagent efficacy. In another embodiment of the invention, the primary antigen target sites are the cumulative result of but not limited to the de-paraffinization, antigen retrieval process, primary antibody performance, secondary amplification to precipitated chromogen, and cover slipping. In yet another embodiment of the invention, the secondary target sites are the cumulative result of, but not limited to the primary antigen targets less the performance of the primary antibody reagent.

In another embodiment of the present invention, the aforementioned stained secondary target group sites provide the baseline upon which the antigen density of the primary sites can be objectively established. It is pertinent to note that one member of each of the secondary protein arrays may also be printed as a 3D target using a polysaccharide as the 3D scaffold. Further, the ratio of chromogen precipitation between the same concentration 2D and 3D targets establishes the scale factor which may be applied to the primary antigen array to enable objective measure of antigen concentration on 3D materials. With the identification of the 3D antigen density as a measure of the chromogen precipitation, a scale or ruler may be applied to the co-resident tissue section to objectively quantify the antigen presence in the tissue section. The presence of both the secondary and primary reactive targets plays a vital role in identifying stain reagent viability and the unmasking by the antigen retrieval process. It should be emphasized that the defects in any of the aforementioned steps or reagents may be easily identifiable in the PRS targets, thus signaling misdiagnosis is probable.

Reference may be made to FIG. 3, which illustrates the possible targets that be employed in the immunohistochemical testing process.

Reference may be made to FIG. 4 which illustrates the architecture of the adhesive coated slide or process record slide wherein, the IHC targets are located below the tissue section to reduce the possibility of a proteins being released from the target materials which may be swept up to the tissue section and becoming captured. The top row of targets is the Mouse gradient density array with the middle row being the Rabbit gradient density array. The bottom row may support twelve targets, which may be primary antigens or a mixture or combination of primary antigens. The black and white imaging reference dots are on the left side of the secondary protein arrays. Just to the right of the pigment targets are the 3D Mouse and Rabbit targets. The balance of the secondary, and all the primary targets, are of 2D configuration. In another embodiment of the invention, a usable glass microscope slide adhesive coating is found on the Thermo-Fisher SuperFrost slide, GL4951P. In still another embodiment, the optimal adhesive coated slide has the attributes of binding covalently to the glass and presenting, but not limited to, two or more (—ROH, —R(C=O) OH, —RNH$_3$, —R(C=O) NH$_2$, and —RNH$_2$) end groups to the biomaterials and being adjustable at time of manufacturing for the surface wettability.

In one embodiment of the present invention, the aforementioned "Process Record Slide-Immunohistochemical" (PRS-IHC) slide may incorporate targets of known reactive behavior for evaluating the antigen retrieval status, primary antibody reagent efficacy, and secondary reagent efficacy. The primary antigen target sites are the cumulative result of the de-paraffinization, antigen retrieval process, primary antibody performance, secondary amplification to precipitated chromogen, and cover slipping. The secondary target sites are the cumulative result of the primary antigen targets less the performance of the primary antibody reagent.

In another embodiment of the present invention, the conformity with the architecture of the aforementioned adhesive coated slide or process record slide, the aforementioned PRS-IHC slide incorporates biological based targets in gradient density arrays that include a black and white imaging reference target. As the targets are of biological origin, a thin film of paraffin may be applied to protect against oxidation and microbial attack. The paraffin film may be removed in the same IHC processing steps as the embedding paraffin of the tissue section. It is mainly emphasized that the PRS-IHC goes through the same experience of tissue capture to cover slipping to record the IHC process and remains forever with the tissue section. A Second opinion and tele-diagnostic becomes viable when the processing experience is known, recorded, and available.

In one embodiment of the present invention the adhesive coated slide or the process record slide facilitates the controls to be co-resident with the patient material so that it cannot be displaced and lost as can be the case with a lab information system (LIS). Thus, the controls must pass through all the experience from biological material capture to cover slipped completion.

In another embodiment of the present invention, the adhesive coated slide or the process record slide is reproducible, stable over time, supports one or more antigens, each as a gradient density array, stable to the current processing of IHC slides and is cost effective. The process record slide provides a quantitative standard for process control and an objective measure on antigen concentration on the co-resident tissue section or loose cells wherein Mouse and Rabbit protein serves gradient density arrays.

In one embodiment of the present invention, IHC staining process, the steps may be described for the insight of the immunohistochemical staining carried out in the adhesive coated slide or the process record slide. The fixed tissue sections are embedded into paraffin, which must be removed to expose the cellular structure of the section through first warming the paraffin into a semi-liquid state then liquefying via xylene (or xylol) followed by progressively diluted ethanol washes and finally a buffer solution. Next, the formaldehyde fixing must be removed to expose the antigen sites. Most commonly, the fixation is removed by either the heat induced epitope retrieval (HIER) process or a much longer warm water antigen retrieval process. The HIER process breaks the Schiff base bond between the formaldehyde and tissue by the application of heat (optimally 89° C. and no greater than 95° C.) while the tissue is exposed to a buffer reagent (pH 6 through 10 depending upon tissue type). At this point, the antigen sites are exposed and the stain reagents can be applied to produce a visible color indication of the targeted antigen's presence. The water-based antigen retrieval process operates about 10° C. higher than the embedding paraffin melt temperatures, about 60-65° C. The soap and many successive washes slowly dissolve and remove the paraffin. Operator or processing defects in the paraffin removal and fixation recovery will block the staining process and yield a false negative result.

Once the antigen sites are unmasked from the formaldehyde fixation, one or two primary conjugated antibody reagents are applied. These will bind to any matching antigen sites found in either the tissue section or the PRS primary antigen target sites. The primary antibody is conjugated onto a Mouse or Rabbit protein which is then acted on by the secondary stain reagents.

In another embodiment of the invention, to attain a sufficient density of the colorant for human visual detection, a multistep amplification process may be carried out. There are a variety of secondary detection kits that range from single to three-step amplifications. All arrive at the same end state of a chromogen precipitation. Typically, one or two of, three commonly used secondary stain groups and one of several counterstains are used: Horseradish peroxidase (HRP), alkaline phosphatase (AP), glucose oxidase and nuclear counterstains. The possible precipitated chromogen colors that may be utilized, can be selected from but are not limited to, those in the following list:

| HRP | |
|---|---|
| DAB (3,3'-Diaminobenzidine) | >>Brown to Red Brown |
| AEC (3-Amino-9-ethylcarbazole) | >>Red |
| DAB + Nickel enhancer | >>Black |
| TNB (3,3',5,5'-Tetramethylbenzidin) | >>Blue |
| Stay Yellow | >>Yellow |
| AP | |
| BCIP/NBT | >>Blue |
| (5-bromo-4-chloro-3-indolyl-phosphate)/ | |
| (nitro blue tetrazolium) | |
| Naphthol AS-MX phosphate + Fast Blue | >>Blue |
| Naphthol AS-MX phosphate + Fast Red | >>Red |
| Naphthol AS-MX phosphate + new fuchsin | >>Red |
| Stay Green | >>Green |
| Glucose oxidase | >>Blue |
| Nuclear Stains | |
| Hematoxylin (most commonly used) | >>Blue |

DAB is well known and widely used in the USA. Many other parts of the world use AEC instead. The reason AEC is rejected by those using DAB is that the red color saturation is too low as compared to the brown-red color of the DAB. Experiments show that the original DAB had significant aging over a short period of time, such that the color saturation drops noticeably within a 4-hour span. Newer versions of DAB incorporate stabilizers that extend the stability of the DAB from hours to days. DAB also has the propensity to be washed out during subsequent buffer wash cycles. AEC, on the other hand, remains stable for weeks to months.

Regulatory standards throughout the world seek, or insist, that validated controls be used to check reagents, methods, and instrumentation for processing of tissue sections and loose cells once such a technology becomes viable and available. Such regulatory controls have long been in place for hematology and clinical chemistry to validate the results and for quality assurance. The result of the controls testing is plotted in the form of a Levey-Jennings chart (Westgard et al. 1981). Westgard J, Barry P, Hunt M, Groth T (1981) "A multi-rule Shewhart chart for quality control in clinical chemistry". Clin Chem 27:493-501.

In another embodiment of the present invention, the controls utilized above must not be significantly affected by the pretreatment steps: de-paraffinization and antigen retrieval. The result measures the efficacy of the IHC stain reagents and develops a scale or ruler to apply against the tissue section for the antigen concentration on the tissue. It is vital to get the insight of the identification that some step or reagent failure occurred, which aids in preventing misdiagnosis.

In another embodiment of the present invention, all of the aforementioned 2D Secondary stain targets are fixed with formaldehyde. The secondary targets are listed below:
Mouse 2D array between 10-100%, 3D @ 100%
Rabbit 2D array between 10-100%, 3D @ 100%
The 2D secondary stain targets incorporate protein gradient density arrays, one of Mouse+Donkey and the other Rabbit+Donkey. The gradient scales follow a known profile curve between 10% and 100% density. Donkey is used over the more commonly used Bovine as the Donkey does not support non-specific staining that sometimes occurs in the secondary stain kits. The ABC secondary stain kit uses a Goat-anti-(Mouse or Rabbit) as the 1st step reagent with the 2nd stain reagent (containing anti-Goat). Goat is too close in species to Bovine which supports capture of the 2nd step secondary stain reagent. Donkey or others within the Equine family avoids this unintended reaction.

In another embodiment of the present invention, the different secondary stains and the precipitated chromogens vary considerably in color density between type and vendor. To account for the variations the 2D gradient density arrays form chromogen density to Mouse and Rabbit protein concentration relationship. While the secondary gradient array mixtures can produce an absolute concentration scale, it cannot account for the slide coating's physical structure. All IHC slides that exhibit both hydrophilic behavior and tissue retention through the HIER processing have a porosity factor. For tissue sections, this is of no consequence other than the slide coating being conformably compliant to the physical irregularities caused by the sectioning blade on the section's surface and reagent spread across the slide surface. However, for proteins the porosity and wettability variables effect how much of the deposit will be required to fill the voids and how much effective surface area will be on the surface top. The porosity will be variable slide-to-slide but, is largely homogenous on any one slide. The individual protein primary dilution is evaluated by its absorbance at 280 nm. The data is then used to formulate the deposited protein array target mixtures, ensuring consistent performance between different IgG lots. All secondary targets are fixed with formaldehyde.

In another embodiment of the present invention, the 2D primary antigen stain targets use peptide stands of the desired antigen coupled to a carrier protein by way of a cysteine residue and Sulfo-SMCC crosslinking. The now conjugated carrier protein is blended with a dummy protein to adjust the concentration. All primary antigen targets are fixed with formaldehyde. Primary targets may be produced in two forms:

a. Gradient density pairs, where the maximum density exceeds the ability of the antibody to bind and the second at a 50% concentration. Each target pair incorporates a singular reactive antigen.

b. An array of antigen targets, each target composed of up to ten different antigens, all at maximum density. The mix of antigen types in each target are such that only one antigen will be reactive during use.

The antigens are composed of peptide strands with a cysteine residue and are bound covalently to a carrier protein having previously been activated with Sulfo-SMCC. Keyhole limpet hemocyanin (KLH) is used because of its non-reactivity with any human antibodies and the known range of sites able to support Sulfo-SMCC. Other similar proteins could be used with equivalent performance.

There is a potential concern over using peptide strands as they are only a short segment of the antigen. If the antibody is not configured as a match, then there will be no detection even though the antibody correctly binds to the antigens on the tissue section or loose cells. Thus, for some antibodies the primary targets must support up to ten different antigen segments. Most labs use between 75 and 100 different antigens. Many labs choose to use the primary antibodies and secondary stains as bundled with the stainer they use. For those antibodies that are fragments of the complete antibody, the mating antigen is very specific. Since the stainer vendors largely develop their own antibodies, the PRS better serves the marketplace as it supports each stainer reagent suite, using option B above.

However, when developing new antibodies, it is very important to test multiple antigen formulations to arrive at the optimal detection condition. This is better served by option A above because it is unknown what the optimal antibody concentration and sensitivity is.

In another embodiment of the present invention, the necessity for 3D targets to translate the 2D target results into a measurement that can be applied to tissue sections. Tissue sections and cells all have a height to them, between 4 and 10 microns. Antigen sites can be anywhere on and within the cellular structure. Those antigen sites that are on vertical structures can have considerable depth in which the chromogen can be precipitated by the enzyme located at the top of the section. Thus, far more chromogen can be precipitated than could take place on a 2D protein deposit. This is the reason that 2D protein and peptide based targets can never be as dark as loose cells and tissue sections.

The DAB reagent aging effects shift the stained result by a considerable amount over a short period of time. The PRS-IHC solution can, however, correct for the shifting decrease in chromogen precipitation simply because the 3D antigen concentration scale is independent to the change in the DAB performance. Since the protein and antigen target arrays are composed of known concentrations, the stain result simply remains with the same relative relationship, albeit compressed. So, while the viewed intensity (darkness) weakens, the scale will continue to provide the same antigen density measure on the tissue section or loose cells.

Imaging Reference Targets

In addition to the 2D and 3D secondary protein target arrays, black and white imaging reference targets are printed.

Digital imaging of microscope slides containing stained biomaterials is evolving to perform prescreening and potentially full diagnostic determination on the stained materials. In general, the imaging system must adjust the illumination light level so that the digital image is not in compression at either the white or black boundaries. The conventional solution is to have black and white targets located where the label is expected to be positioned. The underlying assumption is that the white and black targets represent the extremes that the slide can present. However, in doing so there is compression in the digital scale as the black is much blacker and the white much whiter than can realized by the staining of a tissue section.

In one preferred embodiment of the present invention, a microscope slide is disclosed that incorporates control and reference target standards which are co-resident with a patient tissue section or loose cell deposit. The reference targets and tissue section record the processing experience between tissue capture and cover slipping of the stained slide.

In another embodiment of the present invention, amongst the microscope slide target arrays are co-resident black and white reference targets. The black and white reference targets have experienced that same exposure to reagents and processing as the other targets and tissue section.

In another embodiment of the present invention, both the reference targets i.e. the black and white targets are printed paint deposits which are non-reactive to any of the reagents used to process a slide. The white target in an ideal situation would be a perfect white. However, there is very little stained biomaterial usefulness that gets more than halfway from black to white. Thus, the white can be 5-10% away from perfect white and still be of useful value. In a preferred embodiment, the white is of a metal oxide or sulfate composition that is stable with the passage of time when not left exposed to sunlight. In a more preferred embodiment, the white is aluminum and titanium oxide.

In another embodiment, the black and white targets are both based on an anhydride based epoxy paint base that is catalyzed by direct UV light exposure at nominally 365 nm. The anhydride catalyzer is composed of methyl tetrahydrophthalic anhydride and diphenyliodonium hexafluroroarsenate. Other than UV initiated, anhydrides require the addition of heat to function in catalyzing the epoxy to cross-link. The preferred UV initiated anhydride and its companion are listed, but there are other solutions possible that can be found when performing a search of anhydride producing companies. While such a paint/ink can be constructed as needed, it is usually a purchased component that has been optimized for the printing method being used. Fabrication of the paint/ink must address the difficulty in achieving good wetting between the pigment particles and the epoxy binder. Anhydride based paints (also called an ink when having low viscosity) often have the anhydride mixed in with the epoxy as the pot life can be many months in duration. To lower the viscosity would be known knowledge of those involved in the printing industry and the formulation varies depending on the surface the epoxy mixture is to applied onto and the printing method used. While heat triggered anhydride-epoxy paint/inks are commonly used, the heat necessary to initiate the reaction can potentially damage biomaterials (proteins, peptide, and chemical targets) that may be co-resident with the paint/ink.

In another embodiment, the anhydride catalyzer eliminates the unreacted amines found with an amino-silane based catalyzer that would otherwise support non-specific staining. Free amine end groups can and will capture both biomaterials and some of the special stains. Specifically, this addresses the issue of undesired staining of the white target by the slide processing reagents, in particular the staining reagents. As a free amine end group on the surface of the paint/ink, it can capture both the primary antibody and secondary stain reagents and become stained. Thus, defeating the value of having an integrated white target on the slide.

In another embodiment, the black pigment uses a carbon dust of less than 2 microns diameter while the white uses aluminum, titanium oxide, or barium sulfate beads; preferably, the white uses barium sulfate.

In another embodiment, the preferred epoxy ink/paint formulation avoids surfactants altogether, to prevent leaving the ink/paint reactive to the range of stains and reagents these slides can experience.

In another embodiment, the printing of the targets can be done by pad stamp or syringe. In yet another embodiment, the syringe is preferred as it supports better feature size control of the target deposition.

In another embodiment, the aforementioned white targets are composed of metal oxide or sulfate pigments within an anhydride catalyzed epoxy. In another embodiment, the aforementioned black targets are composed of carbon pigments within a UV initiated anhydride catalyzed epoxy. In another embodiment, the anhydride catalyzer is UV initiated by direct UV light exposure. The primary advantage of using the UV initiated anhydride catalyzer is that the heat needed to initiate anhydride-epoxy reaction exceeds what the biomaterials (proteins, peptide, and chemical targets) can tolerate without damage. More importantly is the elimination of any free amines that could react with the stain reagents.

Shield Coating

Paraffin wax in general, is a white or colorless soft solid, derived from petroleum, coal or oil shale, which consists of a mixture of hydrocarbon molecules containing between twenty and forty carbon atoms. It is solid at room temperature and begins to melt above approximately 37° C. (99° F.); its boiling point is >370° C. (698° F.). Common applications for paraffin wax include lubrication, electrical insulation, and candles; dyed paraffin wax can be made into crayons. It is distinct from kerosene and other petroleum products that are sometimes called paraffin.

In a pathology laboratory, paraffin wax is used to impregnate tissue prior to sectioning thin samples of tissue. Water is removed from the tissue through ascending strengths of alcohol (75% to absolute) and the tissue is cleared in an organic solvent such as xylene or one of the aliphatic substitutes, such as Xylol. The tissue is then placed in paraffin wax for a number of hours and then set in a mold with wax to cool and solidify; sections are then cut on a microtome.

The embedding of tissue sections into paraffin is a routine practice for the preservation of the tissues sections for a prolonged period of time. However, the application of paraffin as a thin coating layer on a selected area of a microscope slide has not been reported. In the present invention, target proteins deposited onto a microscope slide, glass or plastic, present a rich food source to bacteria or fungal antagonists. Additionally, the protein's antigen sites (eg. epitopes) are susceptible to oxidation that effectively neutralizes the ability to bind detection antibodies to the protein. Many of the subsequent reaction binding sites are hydroxyls, which can become damaged through reactions with airborne acids and bases. Typically, slides containing protein deposits are stored at temperatures below what supports microbial growth. However, such a constraint limits the effective utilization of deposits. Additionally, the protein deposited slides are packaged in vacuum sealed containers to prevent oxidation damage. Unprotected protein deposited slides have an open-air shelf life between 2 and 5 days depending upon ambient temperature and airborne contaminate levels.

Paraffin is inherently known as containing anti-fungal and antibacterial agents which prevent the oxidation of the antigen sites and air borne acid/base degradation of the exposed sites. The paraffin shield coating changes the viable life of the biomaterials from 3-5 days to 1-2 years enabling useful product life for the end user.

Removal of the embedding paraffin is also routine practice in order to expose the tissue section to subsequent Immunohistochemical (IHC) staining. Utilizing the same or similar paraffin formulation to shield other deposited materials on the same microscope slide ensures that no additional slide processing must take place before beginning the IHC staining.

In one embodiment of the present invention, the paraffin is blended with a solvent to change the material state from solid to a liquid at room temperatures. The blend uses Paraplast X-tra or equivalent with Xylene or an Aliphatic solvent, for example Xylol to reduce the viscosity and slow down solidification following deposition.

In another embodiment, the solvent may be selected but not limited to toluene, paint thinner, turpentine, or a 50:50 mix of acetone & kerosene. Paraplast X-tra specifically incorporates butylated hydroxytoluene, a phenolic antioxidant, to reduce oxidation degradation of protein, peptide, and inorganic targets.

In another embodiment, the solid paraffin is melted at no more than 75° C. above the paraffin melt temperature until liquid, then slowly add an Aliphatic solvent until the saturation point is observed (solids are formed). Allow the mixture to cool to 45° C. and slowly add more Aliphatic until it is completely clear.

In another embodiment, the aforementioned paraffin coating applied over biomaterial and special stain reactive deposits previously applied to a microscope slide, where biomaterials may include but are not limited to proteins, peptides, conjugated proteins, protein coated beads, peptide coated beads, or conjugated coated beads and the special stain reactive end groups that uniquely capture a special stain material which react with the applied antibody and secondary stain reagents.

In another embodiment, the paraffin layer is selectively applied to the targets on the slide. In still another embodiment, the paraffin layer may be deposited onto the microscope slide which include but are not limited to: spray, inkjet deposit, transfer printing (such as pad printing), screen printing, and vapor deposition. In a preferred embodiment, the paraffin is a thin layer, preferably about no thicker than 5 microns; in another preferred embodiment, the paraffin has a melting temperature of less than 60° C. and preferably less than 56° C. and dissolves with exposure to xylene or xylol (aliphatic replacement) solvents. In yet another preferred embodiment, the paraffin has an ambient temperature hardness similar to the embedding paraffin's.

In another embodiment, the tissue block embedding paraffin materials may include but not limited to TissuePrep & TissuePrep 2 by Thermo Fisher, melting temp 56° C., Paraplast &Paraplast plus by Leica, melting temp 56° C., Paraplast X-tra by Leica, melting temp 50-54° C.

In another embodiment, each is a blend of purified paraffin, synthetic polymers, and other materials to establish the melt temperature, hardness, and viscosity. Inherent to paraffin is non-support of microbial growth.

In another embodiment, the special stains may include but are not limited to: Alcian Blue, Analine Blue—Orange G Solution, Azan Stain, Bielschowsky silver stain, Brow & Benn—Gramm Stain, Cresyl Violet, DAB, Fontana Masson, Gordon and Sweet's silver staining, Grocett's Methanamine silver method, Hall's Bilirubin stain, Jones Methanamine silver method, Luxol Fast Blue, Luxol Fast Blue—Cresyl Violet, Mucicarmine (Mayer's Method), Muller-Mowry colloidal Iron, Orange G, Nuclear Fast Red, PAS with Diastase Digestion, Periodic Acid Schiff (PAS), Phosphotungstic Acid, Haematoxylin, Picro Sirius Red, Toluidine Blue Acidified, Trichrome Gomoris One-Step, Trichrome—Masson's, Victoria Blue, Von Kossa, Weigert's Resorcin Fuchsin, Weigert's Iron Haematoxylin, Zell—Neelsen Method.

In another embodiment, the targets may be selected but not limited to pigment colored deposits such as Black and White, but can include any pigment color.

In another embodiment, the microscope slide on which the aforementioned paraffin coat may be applied may be selected from but not limited to glass, plastic or any polymer material. In another embodiment, the paraffin maybe purified and water free.

In another embodiment, the resultant microscope slide may be post heated to melt and/or blend paraffin particles into a monolithic surface coating sealing both the deposits and the slide surface surrounding the deposits.

In yet another embodiment, the resultant microscope slide is post heated to force the solvent out of the paraffin, ensuring that it returns to a hardened state. This must be done from the paraffin side of the slide, preferably using infrared light. Melting the paraffin from the top down ensures that the solvent is able to rise up and evaporate from the paraffin without encumbrance. The result is illustrated in FIG. 1, which shows how the paraffin ensures a seal at the edges of its deposit.

Antigen Retrieval Monitor

In another embodiment of the present, the Antigen Retrieval Monitor is carried out by the antigen retrieval (hereinafter referred as AR) process, depending upon the process used and its implementation, is quite variable slide-to-slide and stainer-to-stainer. The AR is an open loop process because direct measurement of the AR buffer and the buffer temperature is not actually known, just estimated. The AR process assumes that because the heater was told to serve at a desired temperature that the temperature of the AR buffer is uniformly the same. The AR process also assumes that the AR buffer being used is of the correct mixture using the correct reagent components. Both are assumptions that will result in failure to perform the AR without any tangible feedback to the laboratory.

In another embodiment of the present invention, the PRS incorporates two AR targets: ARM3D and ARM2D plus the 2D secondary arrays. There are three AR states: under recovered, nominal, and over recovered.

The under recovered condition occurs from too low an AR temperature, insufficient exposure time, or not run at all. The ARM2D target is eg. 50:50 mix of Mouse and Rabbit protein (or protein from other species, not limited to mouse and rabbit protein) at 100% concentration with minimal formaldehyde fixation. If this target is stained, the AR process failed to take place. Preferably the protein is IgG.

The over recovered condition occurs from too high an AR temperature, excessive exposure time, or the AR buffer is >pH 9.5 or <pH 5.5. The ARM3D target is a 50:50 mix of Mouse and Rabbit protein (or protein from other species, not limited to mouse and rabbit protein) at 100% concentration deposited in a 3D scaffold that has been over fixed with formaldehyde. If this target is stained, it means the AR process was too aggressive and the slide should not be used for diagnostic evaluation.

The nominal recovered condition occurs when the 10% to no more than the 30% targets of the Mouse and Rabbit gradient density arrays do not show visible staining. The degree of AR damage can then be assessed by the amount of low concentration secondary targets that are not staining. This damage will be seen in the tissue section as well.

Antigen Imaging Scale Extrapolation

It is known that the primary antibody is composed of processed host blood serum obtained from the host animal (eg. Mouse or Rabbit) that was inoculated by the desired antigen fraction. The host then produces blood serum proteins where the antigen sites now contain the antibody reactant to the antigen antagonist. When the antibody is subsequently brought in contact with a protein that contains target antigen, the antigen and antibody bind together. The result is that the antibody of host species (Mouse or Rabbit) is left free to react with the secondary stain kit.

The primary and secondary targets have well defined and regular (such as round) deposition areas upon which the known dispensed volume of target material is applied. Since the protein deposits incorporate a cross-linking coupler, they are not able to sink into the porosity of the slide coating more than a protein deep. When proteins are even loosely cross-linked together their effective size inhibits their ability to sink into the porosity of the adhesive coting. The porosity being not hugely bigger than a pair of proteins cross-linked together. Thus, the proteins are largely left as a coating that is many proteins thick. The cross-linking does not fully take place until the baking step following the deposition of the protein dots onto the slide. Knowing that the protein deposit will not become absorbed by the coating is important as when absorbed into the coating it cannot react later with the stain reagents as there is simply not enough room for the amplification chemistry to exist in the available space. From the point of view of the imaging, some proteins will be lost during the antigen retrieval, but new ones become exposed. Thus, the target dot appears as a mono-layer of proteins as only those at the top of the deposit can react to the staining.

Thus, knowing the protein's atomic mass, the number of proteins of each protein type in the deposit, the target's area and the target's active surface protein density can be computed;

The applied concentration, dispensed volume, and surface area on slide exposed to the reagent of primary antibody are known. It can be reasonably assumed that during the exposure time of the reagent that most of the suspended antibodies will have fallen down and been captured by receptive antigen sites. Only those that fall directly over antigen sites will become captured and the balance will be washed away by a buffer wash step. Thus, the deposited antibody concentration can be established under proper conditions, for example, when the concentration is greater than 25% above cutoff and less than 25% from saturation, wherein the cutoff is defined as insufficient target site density to capture the applied the protein concentration; saturation is defined as a concentration at which not all of the applied protein could be captured.

Knowing the primary dilution ration, the correct primary target density target can be chosen and the primary concentration can be validated;

In one embodiment of the present invention, each secondary and primary target is a mix blend of [(Mouse or Rabbit)+(Donkey+crosslinker+fungal inhibitor)] or [(KLH with antigen A or KLH with antigen B)+(unconjugated KLH+crosslinker+fungal inhibitor)]. Each dot has the same volume of total proteins, but the mix ratio must be adjusted slightly as the atomic masses may be different between the proteins composing a specific target.

Mouse IgG=155 kDa
Rabbit IgG=150 kDa
Donkey IgG=160 kDa
KLH subunits conjugated with antigen peptide strand, where the subunits are KLH1 and KLH2=350 & 390 kDa In another embodiment of the present invention, the 2D secondary target gradient are stepped dilution increments of 1 to 1000:1, preferably, following a −20 log(dilution) profile, wherein the dilution increments in −3 dBd steps. The terms −20 log(dilution)=dBd both refer to describing the dilutions on a semi-logarithmic basis in order to linearize the data so that modifying terms can be easily applied. The term (dilution) refers to the dilution X where X is [1 . . . 1000] equating to 1:1 to 1,000:1. The term dBd is defined as decibels of dilution or the dilution strength. The modifying terms include: antigen retrieval damage, enzyme gain, primary antibody reagent dilution. A single 2D/3D target is used to measure the stain density delta between a 2D base and the 3D particles. The delta can be applied to the balance of the 2D array to produce a color density scale that is a good match to the 3D behavior seen in or on the tissue section;

The secondary 100% 2D/3D and 2D targets verify that the two deposits are matching in regards to the 2D stain density. This is a verification that the 3D particle component did not consume enough of the 100% protein material to cause shifting of the 2D component;

The secondary stain incorporates an enzyme gain function between 1 and 20×, that is a function of the construction of the stain reagent. Therefore, as the gain rises the lower concentration secondary target will shift into saturation whereas when the gain drops to one only the high concentration secondary targets will be visibly stained;

Because of the considerable size difference between the secondary and primary target proteins, the protein concentration density will be established by the primary proteins.

With an average primary antibody atomic mass of 150 kDa, the weight of a single antibody is 150 kDa (1.6605× $10^{12}$), which equates to a weight of 249×$10^{-12}$ ng. If we elect to have a single area of the slide as the only part exposed, then we can develop the amount of applied primary reagent. Therefore, with a closed capillary gap within inside dimensions of 20.3 mm²×0.14 mm high, the volume is 57.2 μL. Ratio for a target area of 1 micron, which yields 2.832 nl of the applied primary antibody reagent;

The primary antibody reagent is diluted from its concentrate to an intermediate dilution of 10 ug/ml. The intermediate dilution is then diluted, from 1:1 to 1000:1, for application onto the slide. This results in a deposition of 31.5 to 7.08 antibodies onto a 1-micron² area for a dilution of 1:1 to 25.1:1 respectively.

To ensure 100% capture ability the primary target should have a safety factor of 100 to 1000×. Choosing the 1000× option then the primary target needs to contain 4×$10^6$ antigen sites. While the KHL subunits are bigger than the applied antibodies, the increase is not enough to change the number of captured antibodies beyond 1:1. Each KLH subunit has an average atomic mass of 370 kDa which equates to a weight of 614.4×$10^{-12}$ ng.

The volume of a protein molecule can be approximated very simply and reliably from the molecular weight of the protein and an average protein partial specific volume. (Partial specific volume=volume/molecular weight.) The average of experimentally determined partial specific volumes for soluble, globular proteins is ~0.73 cm³/g. This value varies from protein to protein, but the range is rather narrow. The equation reduces down to a protein volume of ~(1.212×$10^3$×MW) nm³. Thus, for the KLH subunit the individual volume is 448.44 nm³. If the protein is modeled as a sphere then the diameter of the sphere become 0.132× $MW^{1/3}$ in nm. For the KLH subunit this is 9.436 nm;

For the target diameter of 1 mm a monolayer of the KLH subunits requires 11.237×$10^{27}$ proteins. For the active target density of 4×$10^6$ proteins the minimum dilution ratio becomes 1:2.8×$10^{21}$. In practical terms, any dilution approaching 1:1000 is workable as the evaluation of the primary antibody is dominated by its active protein concentration. Thus, the target density is only limited by its low concentration floor value;

In one embodiment, the secondary target arrays are stepped dilution increments of 1 to 1000:1. A linear slope for the dilution occurs as dBd=−20 log(dilution). For the dilution range listed 1 to 1,000:1, the semi-log range is 0 dB to −60 dBd. Choosing −3 dB dilution steps the secondary target dilutions become: −0, −3, −6, −9, −12, −15, −18, −21 dBd.

The secondary and primary target arrays are all non-reversibly fixed and undergo a much smaller degree of degradation than the tissue or AR targets during the AR process. The degradation comes from protein segments that break free rather than complete proteins. As the AR process continues to act on the protein targets and the tissue section the AR damage is seen as the gradient scale pattern shifts towards the 100% position. On the other hand, the secondary enzyme gain causes the gradient array to shift towards the 10% position. The enzyme gains are: 1, 2, 4, 5, 8, 10, 15, and 20. This translates into shifting the secondary array towards the 10% target by:

1. 20× all targets shift −26 dBd
2. 15× all targets shift −23.52
3. 10× all targets shift −20
4. 5× all targets shift −13.98
5. 4× all targets shift −12.04
6. 2× all targets shift −6.02
7. 1× only 2D 100% dot near black Typically, AR damage that shifts the secondary array towards the 100% position by three or more dots is considered to be excessive and the slide should be redone using a higher enzyme gain secondary stain kit or a higher concentration of antibody;

The primary antigen target color density is thus the collective sum of the antibody concentration times the enzyme gain of the secondary stain kit. While the secondary target density is only that of the enzyme gain times the secondary target protein concentration;

Depending on the digital imaging system, changes in the illumination intensity will shift the dynamic range of the image into saturation (getting darker) or cutoff (getting lighter). These changes will shift the antigen color scale while the antigen density numeric scale will not. Thus, the numeric scale is independent and the color scale dependent on the illumination intensity.

In one embodiment of the present invention, the aforementioned secondary protein target arrays are formed as two lines: one of Mouse IgG and the other Rabbit IgG mixed with a dummy IgG blood serum protein to form a five or more member gradient density series that progresses from max density to min density in a −20 log(dilution) linear slope, wherein the dilutions may range between 1:1 to 1,000:1 after the initial 1000:1 dilution.

In another embodiment, in the last process step, those antigen sites identified become colored by chromogen precipitation. Thus, the Mouse & Rabbit target array reflects the −20 log(dilution) linear slope of secondary stain kit chromogen precipitation.

In another embodiment, the preferred solution for the method for forming the primary antigen density scale is predicated on successfully composing the target mixtures, depositing them onto the adhesive coated slide, and having a covalent bond between the adhesive and the target materials.

In another embodiment, deducing that the target arrays are successfully applied and the both the primary and secondary stain reagents perform reasonably then the curve fitting between the data sets can be easily done by computer algorithm. In another embodiment, the primary stain may be selected from any IHC approved antibody that uses a Mouse or Rabbit host protein that is not also conjugated to a fluorescent marker or integrated with an enzyme site (such as HRP or AP). In another embodiment, the secondary stain may be selected from but not limited to the secondary stains with enzyme gains of 1× through 25×, that are each uniquely independent between Mouse and Rabbit, which each use a different color chromogen.

In another embodiment of the present invention, it is pertinent to note that the performance result in an absolute basis on one slide may not be identical to another slide done at another time. This comes from the fact that the secondary stain kits vary in performance lot to lot as does the primary conjugated primary antibody. However, the performance for any one process record slide the antigen scale will be valid and give close equivalence to another done using different stain reagents.

In another embodiment, the primary antigen concentration scale is then applied to the co-resident tissue section to access the tissue section for detected cellular defects, such as cancer.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

"Inorganic targets" is used to represent a target or material that is able to bind to the stains used in the detection. The stain is selected from the group consisting of Alcian Blue, Bielschowsky Silver Stain, Bismarck Brown, Gram Stain, Cresyl Violet, Fontana Masson, Gordan and Sweet's Silver Staining, Light Green SF or Fast Green FCF, Grocott's Methanamine Silver Method, Hall's Bilirubin Stain, Luxol Fast Blue Mucicarmine, Muller-Mowry Colloidal Iron, New Methylene Blue, Nuclear Fast Red, Oil Red O, Orange G, PAS, PAS with Diastase Digestion, Periodic Acid Schiff (PAS), Phosphotungstic acid, Picro Sirius Red, Prussian Blue Reaction, Toluidine Blue Acidified, Trichrome-Gomori's One-Step, Trichrome-Masson's, Verhoff-Van Geison, Von Kossa, Weigert's Resorcin Fuchsin, Zeil-Neelsen.

The targets include, but are not limited to: a blend of polyphosphoric acid and polyvinylalcohol, Sodium 4-hydroxybenzenesulfonate, Hydroquinone, Isobutanol, Phenolsulfonic acid, p-Toluene Sulfonyl Chloride, and others using a hydroxyl end group that is covalently bound to the slide's adhesive coating.

"Inorganic deposit" is used to indicate the accumulated amount of stain particles after staining process. In some embodiments, the inorganic deposit is stain.

"Haematoxylin" or "hematoxylin" also called natural black, is a compound extracted from the heartwood of the logwood tree (*Haematoxylum campechianum*). Haematoxylin and eosin together make up haematoxylin and eosin stain, one of the most commonly used stains in histology.

"Eosin" is most often used as a counterstain to hematoxylin in H&E (haematoxylin and eosin) staining. H&E staining is one of the most commonly used techniques in histology. Tissue stained with haematoxylin and eosin shows cytoplasm stained pink-orange and nuclei stained darkly, either blue or purple.

Hematoxylin and Eosin (H&E) staining is used to process a myriad of biological samples to support a first view for ImmunoHistoChemical (IHC) processing, H&E as the finished result, or with Special Stains to deliver a finished result.

"Papanicolaou stain" (also Pap stain) is a multichromatic staining technique for cytopathology evaluation of various bodily secretions. The most common use is for gynecological smears (Pap smear). Other applications include sputum, brushings, washings, urine, cerebrospinal fluid, abdominal fluid, pleural fluid, synovial fluid, seminal fluid, fine needle aspiration material, tumor touch samples, and other materials containing loose cells.

The Pap smear test is done on women at various intervals depending upon their age to perform cervical cancer screening. The frequency increases to yearly for women older than 50 in most parts of the world. The Pap smear testing in this instance is used specifically to test squamous cells scraped from a woman's uterus at the outer opening of the cervix, where the outer squamous cervical cells meet the inner glandular endocervical cells, for abnormal growth that would signal pre-cancer or cervical cancer.

The Pap smear test is not fully standardized in the composition and timing of the dyes used, ratios, and timing. The Pap staining involves five dyes that are mixed into three solutions. The three solutions are: a nuclear stain, first counter stain, and second counter stain.

A nuclear stain, which is a Mordanted hematoxylin mixture, is used to stain the cell nuclei.

The first counterstain Orange Green, which is a mixture of phosphotungstic acid and Orange G.

The second counterstain is Eosin Azure, which is a mixture of Eosin Y, Light Green SF (or Fast Green FCF), and Bismark Brown.

It is therefore an object of the present invention to provide a system which incorporates the co-resident targets with the tissue sample or loose cells. Therefore, the aforementioned targets must have the following attributes: chemical molecules that are covalently bound to the slide's adhesive and will subsequently covalently capture the stain molecule.

In the one embodiment of the present invention, a process record slide incorporates a collection of different inorganic stain specific targets that are co-resident with the biological materials being stained. The targets represent the efficacy of each stain component, and for stains having known ageing behaviors, a gradient density array. The aforementioned targets must uniquely react with but one of the stain components. Using biological materials is not practical as the reactive site concentration will not be well controlled and thus not repeatable.

In another embodiment of the present disclosure, the process record slide is coated with an adhesive using a variety of reactive chemistries to capture the targets and tissue section or loose cells. In the target solutions developed for the Special Stains above, all use a hydroxyl end group to support a covalent bond to the slide coating. The most common adhesive coated slide uses an amino-silane coating available from most all microscope slide manufacturers. The amine end group will form a covalent bond to a hydroxyl that remains stable through 85° C. However, the invention does not limit the use of other end groups on the targets or the use of an intermediate coupler if so needed to match to a different adhesive slide coating chemistry.

Figure 7:
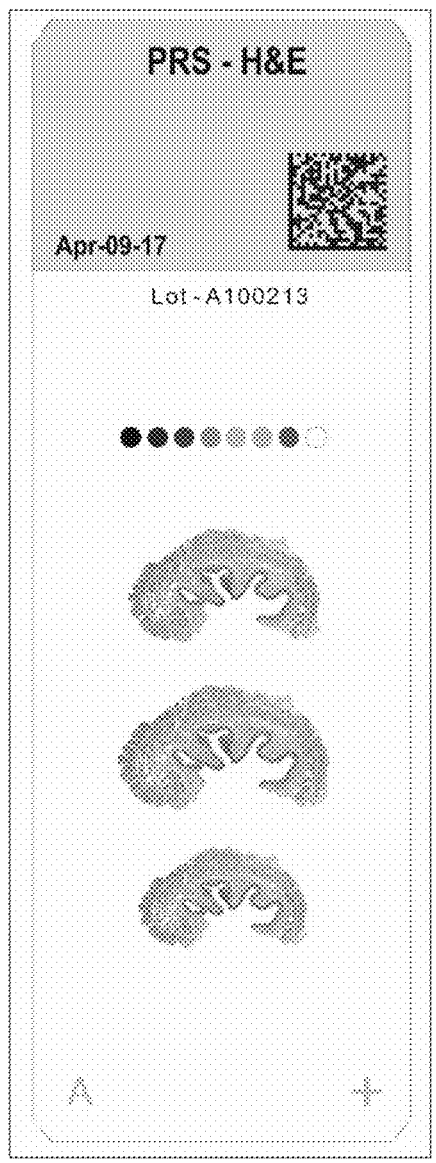
FIG. 7 illustrates the architecture of the process record slide for H&E staining in accordance to one embodiment of the present invention. The illustration shows the slide with the optional slide label in place.

Reference may be made to FIG. 7, which illustrates the implementation of the H&E onto a process record slide. The basic architecture of co-resident targets for the H&E slide in the dual marking configuration in one embodiment is illustrated in FIG. 7.

In one embodiment, the process record slide follows the general architecture of marking just below the label area with the lot number and optionally of marking the slide's label with the slide type. All to most of the label area is left for the user to apply their 2-d bar code and text information. The slide type is PRS-H&Exx, where xx defines the "Special Stain" set applied on the second row. If xx is not present then there is no second line of targets. The targets are printed near the label end to maximize the area for tissue section replicates. FIG. 2A-C illustrate the sequence of the IHC slide's usage. As can be seen the title has been left off as this is optional and can be embedded with the lot code.

In another embodiment, the basic version of the slide contains a target series composed of one Eosin Y and a gradient density array for Hematoxylin which are bounded at the ends by a black and white target. The black and white targets are used to establish the dynamic range for digital imaging. The black and white end targets enable the user to know where the targets are located on the slide, since the other targets are largely clear, so that tissue sections are not applied on top of the targets. This is of great value when transferring frozen tissue sections onto the slide blank.

Figure 8A:
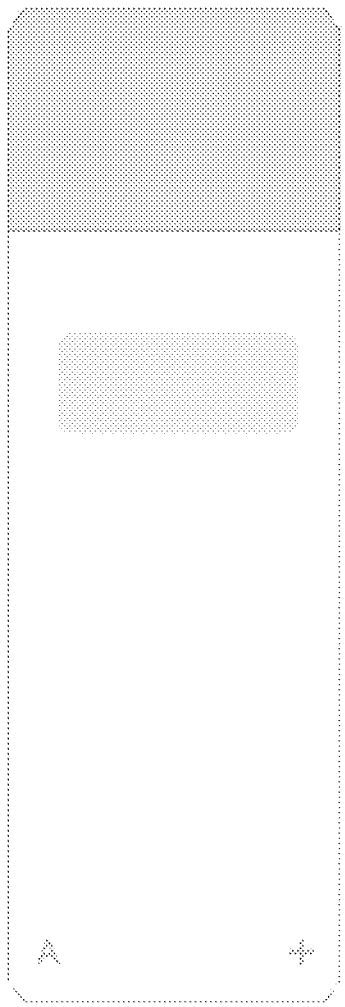
FIG. 8A shows the PAP-M slide as manufactured. PAP-M is the slide type identifier for a manually applied Pap smear. The slide has the minimal ID via the lot code number with a blank area in the painted label area. There are two thick painted long axis bars that extend beyond the area of the target dots. The bars are a recent addition to address how the label printers dispense slides from the bottom of a stack. The bars ensure that the stack of slides above do not damage the slide coating and more importantly the paraffin shield coating and the targets dots below the paraffin.
Figure 8B:
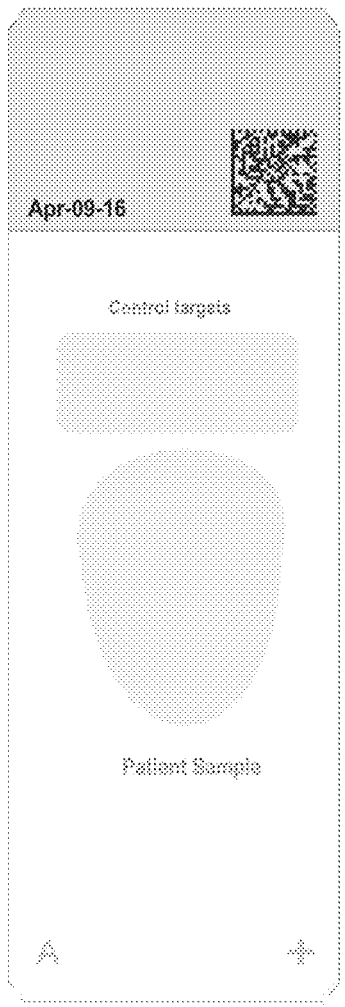
FIG. 8B shows the PAP-M slide with the patient sample of loose cells plus mucus and debris. As the cells are largely transparent, the deposit would appear as just a slight clear haze on the slide.
Figure 8C:
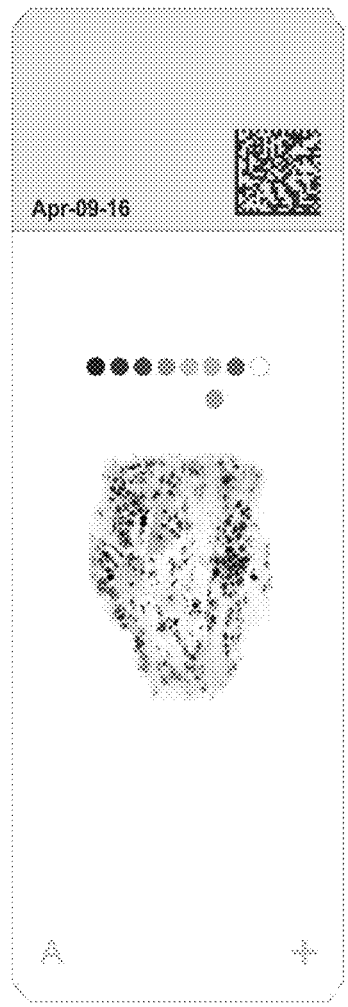
FIG. 8C shows the PAP-M slide after being stained. Both the targets and manual PAP smear are now visible and ready for interpretation.
Figure 9A:
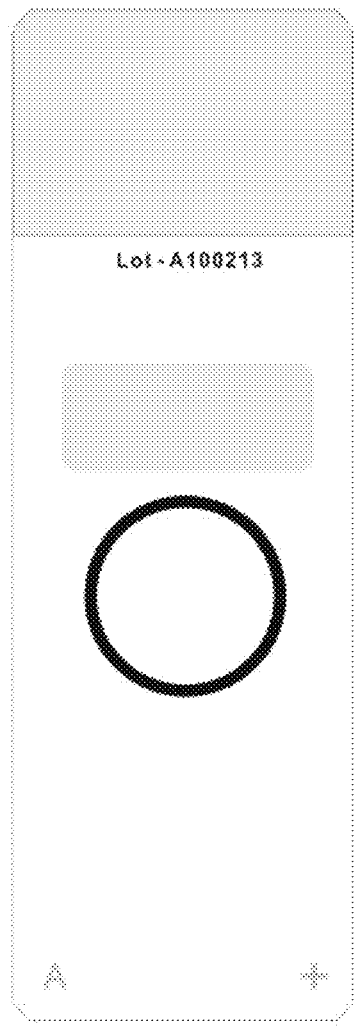
FIG. 9A shows the PAP-A slide as manufactured. PAP-A is the slide type identifier for an automated mucus cleaned Pap smear. The slide has the minimal ID via the lot code number with a blank area in the painted label area. This slide incorporates a hydrophobic barrier ring within which the 'cleaned' PAP sample is deposited. The barrier ring functions to retain the sample and keep the label printer from damaging the coating within the ring and the paraffin covered control targets.
Figure 9B:
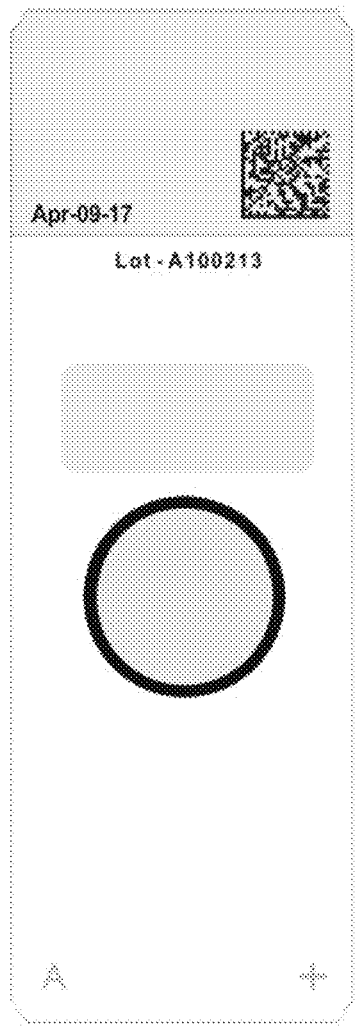
FIG. 9B shows the PAP-A slide with the 'cleaned' patient sample of loose cells within the hydrophobic barrier ring. As the cells are largely transparent, the deposit would appear as just a slight clear haze on the slide.
Figure 9C:
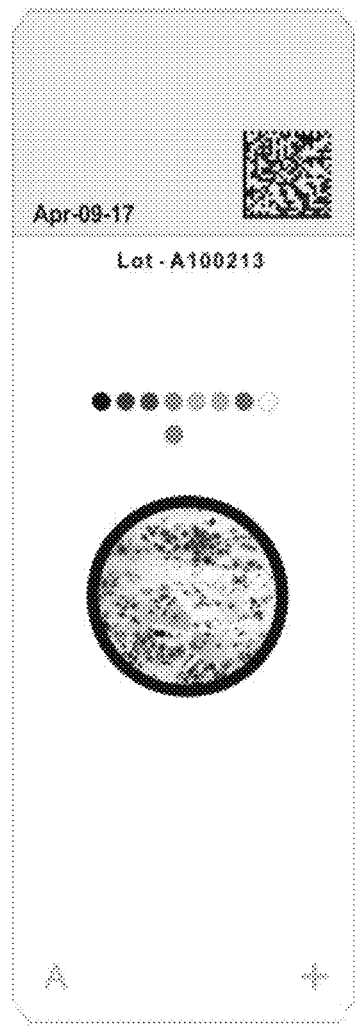
FIG. 9C shows the PAP-A slide after being stained. Both the targets and loose cells within the barrier ring are now visible and ready for interpretation.

Reference may now be made to FIGS. 8 and 9, which illustrates the slide for PAP smear staining.

In one embodiment of the present invention, the process record slide for Pap smears is implemented in two configurations: manual smear FIG. 8 and automated mucus cleaned FIG. 9. Illustrations are shown for both versions.

In another embodiment, both slides follow the general process record slide architecture of marking just below the label area with the lot number and optionally of marking the slide's label with the slide type. All to most of the label area is left for the user to apply their 2-d bar code and text information.

In another embodiment, the stain reagent targets are in two groups: top row contains a gradient density array of hematoxylin+Mordant reactive targets bounded by black and white reference targets. The bottom row contains a single target for Bismark Brown, two different density targets for phosphotungstic acid, two different density targets for the green stains, a single target for Orange G, and a single target for Eosin Y. The patient Pap smear is applied to the middle of the active area on the slide. The automated adhesive-PAP slide version uses a hydrophobic barrier ring to prevent the cleaned cell slurry from the slide maker from spreading. The hydrophilic behavior of the coating ensures the cells will not pile up along the walls of the ring. Both dip-n-dunk bath and capillary gap stain processing can be supported by these slides.

In another embodiment, each stain is described below and mode for binding with loose cell and tissue sections. Afterwards, the chemical construct is described that will uniquely capture the stain.

The present disclosure further includes the following embodiments:

1. An adhesive coated microscope slide containing array of inorganic targets each reactive to a single stain and covalently bound to the adhesive coating wherein said slide comprising:
   (a) optionally, an lot code number marking at just below the label space;
   (b) an area for co-resident targets;
   (c) an area for the application of tissue section or loose cells;
   optionally, a set of special stains are applied to the slide depending upon the slide type marking or lot code marking.

2. The adhesive coated slide as in embodiment 1 wherein, the inorganic targets are selected to uniquely react with Special Stains selected from Alcian Blue, Bielschowsky Silver Stain, Bismarck Brown, Gram Stain, Cresyl Violet, Fontana Masson, Gordan and Sweet's Silver Staining, Light Green SF or Fast Green FCF, Grocott's Methanamine Silver Method, Hall's Bilirubin Stain, Luxol Fast Blue Mucicarmine, Muller-Mowry Colloidal Iron, New Methylene Blue, Nuclear Fast Red, Oil Red O, Orange G, PAS with Diastase Digestion, Periodic Acid Schiff (PAS), Phosphotungstic acid, Picro Sirius Red, Prussian Blue Reaction, Toluidine Blue Acidified, Trichrome-Gomori's One-Step, Trichrome-Masson's, Verhoff-Van Geison, Von Kossa, Weigert's Resorcin Fuchsin, Zeil-Neelsen.

3. The adhesive coated slide as in embodiment 1 wherein, the slide type marking on the label part of the slide may select a specific set of Special Stains to process the biomaterial sample for Hematoxylin and Eosin, Papinocolaou, or Urine staining.

4. The adhesive coated slide as in embodiment 1 wherein, the co-resident reactive targets are selected to uniquely bind to Hematoxylin, Phosphotungstic acid, Orange G, Eosin Y, Light Green SF or Fast Green FCF, Bismarck Brown.

5. The adhesive coated slide as in embodiment 1 wherein, the co-resident targets are printed near the label end to maximize the area for tissue section replicates.

6. The adhesive coated slide as in embodiment 1 wherein, said adhesive coated microscope slide may optionally comprise a hydrophilic barrier ring to prevent the cleaned cell slurry from spreading.

7. The adhesive coated slide as in embodiment 1 wherein, dip and dunk and capillary gap staining processing may supported by these slides.

Shield Coating

Paraffin wax in general, is a white or colorless soft solid, derived from petroleum, coal or oil shale, which consists of a mixture of hydrocarbon molecules containing between twenty and forty carbon atoms. It is solid at room temperature and begins to melt above approximately 37° C. (99° F.); its boiling point is >370° C. (698° F.). Common applications for paraffin wax include lubrication, electrical insulation, and candles; dyed paraffin wax can be made into crayons. It is distinct from kerosene and other petroleum products that are sometimes called paraffin.

In a pathology laboratory, paraffin wax is used to impregnate tissue prior to sectioning thin samples of tissue. Water is removed from the tissue through ascending strengths of alcohol (75% to absolute) and the tissue is cleared in an organic solvent such as xylene or one of the aliphatic substitutes, such as Xylol. The tissue is then placed in paraffin wax for a number of hours and then set in a mold with wax to cool and solidify; sections are then cut on a microtome.

The embedding of tissue sections into paraffin is a routine practice for the preservation of the tissues sections for a prolonged period of time. However, the application of paraffin as a thin coating layer on a selected area of a microscope slide has not been reported.

Tissue blocks and sections cut from the tissue block are infused with paraffin that completely replaces the water content of the tissue's cellular structure. The paraffin inherently does not support bacterial and fungal growth, which ensures long term stability of the embedded biomaterials.

Targets that react uniquely with the chemical structure of inorganic stains are also susceptible to oxidation and reaction with airborne materials. Such stain reactant targets include those for Hematoxylin, Eosin, and most of the special stains group. The targets for these stains are designed to react singularly with but one stain. Biological targets do not, for the most part, provide for such singularity but chemical constructs can. Therefore, the present invention provides a solution by providing a method for selectively coating the targets and inorganic deposits (eg. stains) to shield them from any kind of degradation on any kind of microscope slide.

In one embodiment of the present invention, the paraffin is blended with a solvent to change the material state from solid to a liquid at room temperatures. The blend uses Paraplast X-tra or equivalent with Xylene or a Green Xylene replacement: an Aliphatic solvent, for example Xylol to reduce the viscosity and slow down solidification following deposition. In another embodiment, the solvent may be selected but not limited to toluene, paint thinner, turpentine, or a 50:50 mix of acetone & kerosene.

In another embodiment, the solid paraffin is melted at no more than 75° C. above the paraffin melt temperature until liquid, then slowly add an Aliphatic solvent until the saturation point is observed (solids are formed). Allow the mixture to cool to 45° C. and slowly add more Aliphatic until it is completely clear.

In another embodiment, the aforementioned paraffin coating applied over inorganic targets with the special stain reactive end groups that uniquely capture a special stain material which react with the applied antibody and secondary stain reagents and special stain reactive deposits previously applied to an adhesive coated a microscope slide.

In another embodiment, the paraffin layer may be deposited onto the adhesive coated microscope slide which include but are not limited to: spray, inkjet deposit, transfer printing (such as pad printing), screen printing, and vapor deposition. In all deposition methods, the paraffin layer must be less than 5 µm thick to ensure that during the paraffin removal step of the staining process, all the paraffin (shield and tissue section embedding) can be dissolved and carried away. Independent of the deposition process/method, the criterion of the paraffin is:

A thin layer, preferably about no thicker than 5 microns,
Have a melting temperature of less than 60° C. and preferably less than 56° C. and dissolves with exposure to xylene or xylol (aliphatic replacement) solvents, and
Have ambient temperature hardness similar to the embedding paraffin's.

In another embodiment, the tissue block embedding paraffin materials may include but not limited to TissuePrep & TissuePrep 2 by Thermo Fisher, melting temp 56° C., Paraplast &Paraplast plus by Leica, melting temp 56° C., Paraplast X-tra by Leica, melting temp 50-54° C. Paraplast X-tra specifically incorporates butylated hydroxytoluene, a phenolic antioxidant, to reduce oxidation degradation of inorganic targets.

In another embodiment, each is a blend of purified paraffin, synthetic polymers, and other materials to establish the melt temperature, hardness, and viscosity. Inherent to paraffin is non-support of microbial growth.

In another embodiment, the special stains may include but are not limited to: Alcian Blue, Analine Blue—Orange G Solution, Azan Stain, Bielschowsky silver stain, Brow & Benn—Gramm Stain, Cresyl Violet, DAB, Fontana Masson, Gordon and Sweet's silver staining, Grocett's Methanamine silver method, Hall's Bilirubin stain, Jones Methanamine silver method, Luxol Fast Blue, Luxol Fast Blue—Cresyl Violet, Mucicarmine (Mayer's Method), Muller-Mowry colloidal Iron, Orange G, Nuclear Fast Red, PAS with Diastase Digestion, Periodic Acid Schiff (PAS), Phosphotungstic Acid, Haematoxylin, Picro Sirius Red, Toluidine Blue Acidified, Trichrome Gomoris One-Step, Trichrome—Masson's, Victoria Blue, Von Kossa, Weigert's Resorcin Fuchsin, Weigert's Iron Haematoxylin, Zell—Neelsen Method.

In another embodiment, the targets may be selected but not limited to pigment colored deposits such as black and white, but can include any pigment color.

In another embodiment, the slide on which the aforementioned paraffin coat may be applied may be selected from but not limited to glass, plastic or any polymer material. In another embodiment, the paraffin maybe purified and water free.

In another embodiment, the resultant microscope slide may be post heated to melt and/or blend paraffin particles into a monolithic surface coating sealing both the deposits and the slide surface surrounding the deposits.

In yet another embodiment, the resultant microscope slide heat after the paraffin is deposited to force the solvent out of the paraffin, ensuring that it returns to a hardened state. This must be done from the paraffin side of the slide, preferably using infrared light. Melting the paraffin from the top down ensures that the solvent is able to rise up and evaporate from the paraffin without encumbrance. The result is illustrated in FIG. 1, which shows how the melted paraffin ensures a good seal at the edges of its deposit.

Imaging Reference Targets

In addition to target arrays, black and white imaging reference targets are printed.

Digital imaging of microscope slides containing stained biomaterials is evolving to perform prescreening and potentially full diagnostic determination on the stained materials. In general, the imaging system must adjust the illumination light level so that the digital image is not in compression at either the white or black boundaries. The conventional solution is to have black and white targets located where the label is expected to be positioned. The underlying assumption is that the white and black targets represent the extremes that the slide can present. However, in doing so there is compression in the digital scale as the black is much blacker and the white much whiter than can realized by the staining of a tissue section.

In one preferred embodiment of the present invention, a microscope slide is disclosed that incorporates control and reference target standards which are co-resident with a patient tissue section or loose cell deposit. The reference targets and tissue section record the processing experience between tissue capture and cover slipping of the stained slide.

In another embodiment of the present invention, amongst the microscope slide target arrays are co-resident black and white reference targets. The black and white reference targets have experienced that same exposure to reagents and processing as the other targets and tissue section.

In another embodiment of the present invention, both the reference targets i.e. the black and white targets are printed paint deposits which are non-reactive to any of the reagents used to process a slide. The white target in an ideal situation would be a perfect white. However, there is very little stained biomaterial usefulness that gets more than halfway from black to white. Thus, the white can be 5-10% away from perfect white and still be of useful value. In a preferred embodiment, the white is of a metal oxide or sulfate composition that is stable with the passage of time when not left exposed to sunlight. In a more preferred embodiment, the white is aluminum and titanium oxide.

In another embodiment, the black and white targets are both based on an anhydride based epoxy paint base that is catalyzed by direct UV light exposure at nominally 365 nm. The anhydride catalyzer is composed of methyl tetrahydrophthalic anhydride and diphenyliodonium hexafluroroarsenate. Other than UV initiated, anhydrides require the addition of heat to function in catalyzing the epoxy to cross-link. The preferred UV initiated anhydride and its companion are listed, but there are other solutions possible that can be found when performing a search of anhydride producing companies. While such a paint/ink can be constructed as needed, it is usually a purchased component that has been optimized for the printing method being used. Fabrication of the paint/ink must address the difficulty in achieving good wetting between the pigment particles and the epoxy binder. Anhydride based paints (also called an ink when having low viscosity) often have the anhydride mixed in with the epoxy as the pot life can be many months in duration. To lower the viscosity would be known knowledge of those involved in the printing industry and the formulation varies depending on the surface the epoxy mixture is to applied onto and the printing method used. While heat triggered anhydride-epoxy paint/inks are commonly used, the heat necessary to initiate the reaction can potentially damage biomaterials (proteins, peptide, and chemical targets) that may be co-resident with the paint/ink.

In another embodiment, the anhydride catalyzer eliminates the unreacted amines found with an amino-silane based catalyzer that would otherwise support non-specific staining. Free amine end groups can and will capture both biomaterials and some of the special stains. Specifically, this addresses the issue of undesired staining of the white target by the slide processing reagents, in particular the staining reagents. As a free amine end group on the surface of the paint/ink, it can capture both the primary antibody and secondary stain reagents and become stained. Thus, defeating the value of having an integrated white target on the slide.

In another embodiment, the black pigment uses a carbon dust of less than 2 microns diameter while the white uses aluminum, titanium oxide, or barium sulfate beads. Barium sulfate is the preferred white pigment this application.

In another embodiment, the preferred epoxy ink/paint formulation avoids surfactants altogether, to prevent leaving the ink/paint reactive to the range of stains and reagents these slides can experience.

In another embodiment, the printing of the targets can be done by pad stamp or syringe. In yet another embodiment, the syringe is preferred as it supports better feature size control of the target deposition.

In another embodiment, the aforementioned white targets are composed of metal oxide or sulfate pigments within an anhydride catalyzed epoxy. In another embodiment, the aforementioned black targets are composed of carbon pigments within a UV initiated anhydride catalyzed epoxy. In another embodiment, the anhydride catalyzer is UV initiated by direct UV light exposure. The primary advantage of using the UV initiated anhydride catalyzer is that the heat needed to initiate anhydride-epoxy reaction exceeds what the biomaterials (proteins, peptide, and chemical targets) can tolerate without damage. More importantly is the elimination of any free amines that could react with the stain reagents.

Hematoxylin

Hematoxylin is not a dye in itself and will not bind to biomaterials. However, when mixed with a Mordant, a weak acid, and other materials a dye is formed that forms a covalent bond to the target sites. The choice of Mordant affects what tissue elements the dye will bind onto. For the Pap smear Hematoxylin is used to stain the cell nuclei. Therefore, the Mordant choices to stain cell nuclei are Aluminum, Iron, and Tungsten which usually result in Aluminum being chosen. The hematein is oxidized hematoxylin as illustrated below.

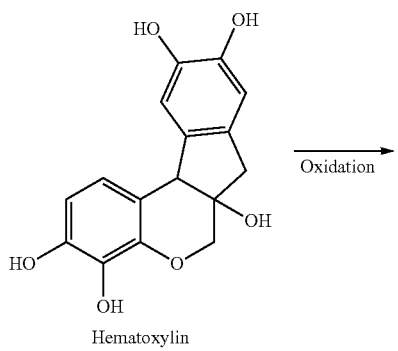

Hematoxylin

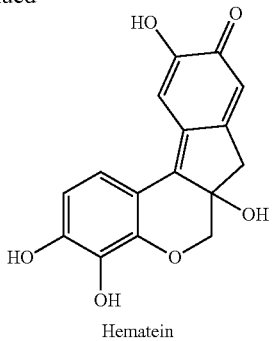

Hematein

The aluminum mordant modification to the hematein end group occurs as:

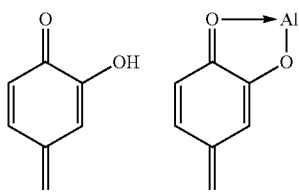

Binding of hematein+Mordant to phosphate base units in the DNA is shown below:

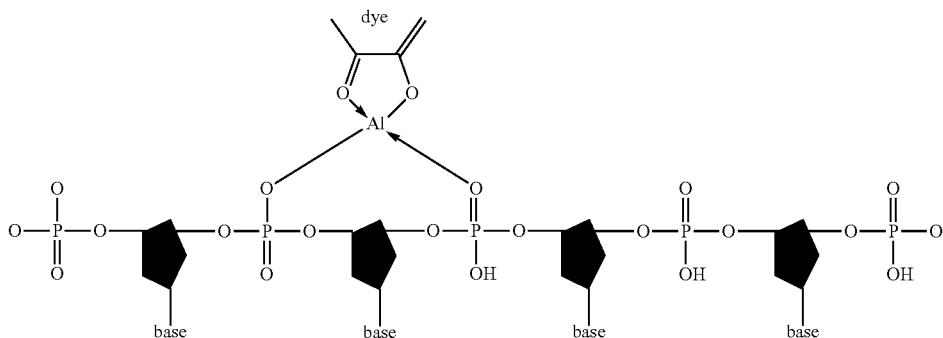

A synthetic polyphosphoric acid can replace the DNA strand to form a unique target site to capture the hematein+Mordant dye. To complete the formulation however, a similar polymer is needed that is unreactive to the dye such that the target concentration can be adjusted for a gradient density array of target sites. Polyphosphate is a weak base. However, the polymer must be converted into polyphospheric acid which requires the donation of a hydrogen atom to the O-end group. This can be done using hydrogen peroxide, HOHO, which results in $H_2O$ as the leaving group.

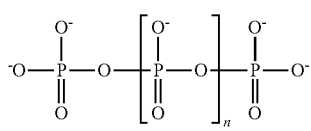

Polyphosphate + HOHO (Hydrogen Peroxide)>>

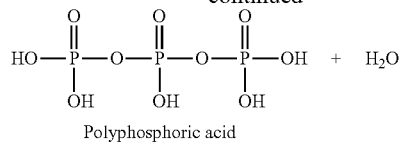

Polyphosphoric acid

The goal is to control the density of the polyphosphoric acid sites to form a gradient density array. To achieve this the polyphosphoric acid must be mixed with another hydroxyl polymer so that both can realize a covalent bond to the substrate adhesive. The solution is to use polyvinylalcohol, PVA, or similar polymer.

The rational for providing a gradient density array of targets for Hematoxlyin comes from the organic origin of the Hematoxylin that includes other materials and the conversion into a Mordanted Hematein dye. The factors that affect the color and color density of the Hematoxylin targets and co-resident tissue are the following:

The concentration of the Mordanted Hematein dye varies with time, especially if processing is done in baths. The carryover of rinse water dilutes the bath. The bath will form a gradient density becoming denser the deeper into the bath the slide reaches if the reagent is not kept in motion. The settling occurs because the molecular weight of the dye is large compared to the water which makes up the majority of the bath.

1. The oxidation process that converts hematoxylin to hematein continues irregularity to take place over time, resulting in reduced dye strength and precipitated dye that must be removed.

2. Oxidation of hematoxylin can produce several oxidized derivatives: mono-, di-. Tri-, penta-, and tetro-hematein. Each aluminum Mordant hematein has a different color as a function of the oxidation derivative: di- & tri- are purple to blue, tetro- is brownish, and pento- is clear. Other Mordants will shift the color basis in a similar fashion.

3. Aerobic oxidation of the hematein stock solution can also contribute to degradation.

Identification of the hematein+Mordant dye condition and type becomes easier if a target series of different reaction site densities is used. The gradient series will go from saturated to midrange. Thus, as the stain concentration weakens and/or the oxidation degrades, the hematein the saturated targets will slip out of saturation allowing the dye concentration to be evaluated.

Phosphotungstic Acid

Phosphotungsten acid (TPA) is a heteropoly acid with the chemical formula of H3PW12O40. It can be better described as tungsten acid cage around a single phosphoric acid molecule as illustrated below:

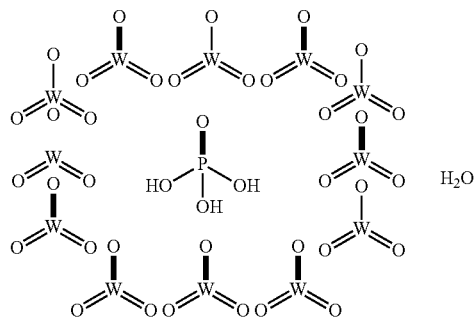

The phosphotungstic acid alone binds biomaterials through a pair of adjacent CH3 end groups as occurring in the valine and leucine amino acids. The phosphotungstic acid binds to fibrin and collagen by replacing the anions of dyes from these materials, selectively decoloring them.

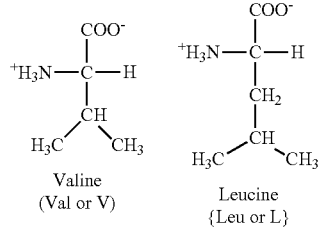

Two adjacent tungstic acid groups within the phosphotungstic acid react with the two CH3 end groups to form:

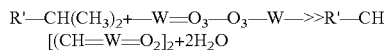

The inorganic target becomes isobutanol (isobutyl alcohol) HOCH2CH(CH3)2, where the hydroxyl binds to the adhesive coating.

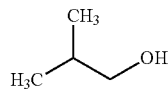

Orange G

Orange G is a synthetic azo dye usually coming with a disodium salt. For Pap staining the Orange G is used to stain keratin. The original function was to stain the small cells of keratinizing squamous cell carcinoma that is present in sputum.

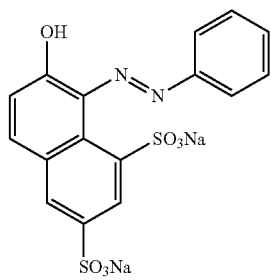

The target needs to be a benzene ring with —SO3Na and —OH end groups. This needs to be constructed by 4-hydroxybenzenesulfonic acid mixed with NaCl or purchased in converted form.

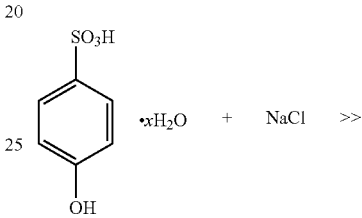

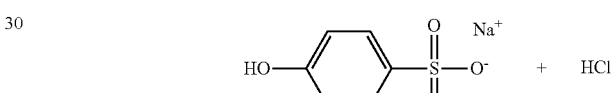

The product becomes: Sodium 4-hydroxybenzenesulfonate

When the target end group R(C6H4) SO4Na reacts with the —RSO4Na on the Orange G stain the reaction becomes:

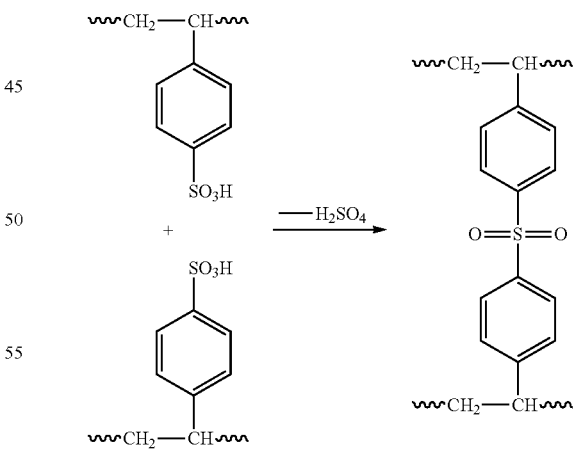

Except the H is Na so the waste product becomes Na2SO4, Sodium Sulfate, which precipitates as a white powder.

Eosin Y

Eosin Y is a form of eosin. It is commonly used as an acidic red stain for highlighting the cytoplasm in cells. In the Pap smear the Eosin Y stains the superficial epithelial squamous cells, nucleoli, cilia, and red blood cells. Eosin Y binds to three known end groups:
- Phenolic groups
- Carboxyl groups
- Metal oxides

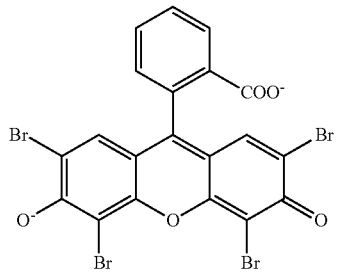

For our application, it is important to use a target that uniquely reacts with the eosin and no other special stain. The phenolic group is the only viable choice.

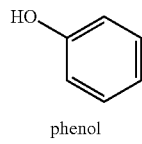

phenol

To be consistent with the other Pap targets the phenol must have opposing hydroxyl end groups as occurs in:

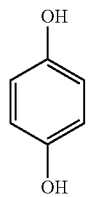

Light Green SF or Fast Green FCF

Light Green SF is a green triarylmethane dye while Fast Green FCF is a sea green triarylmethane dye. The dye stains the cytoplasm of cells other than keratinized squamous cells. The structures are very similar allowing a single target to support both green dyes.

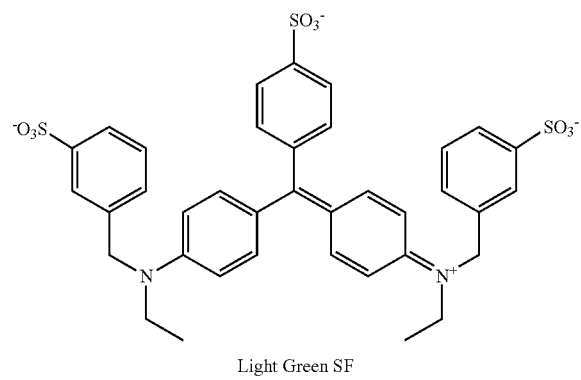

Light Green SF

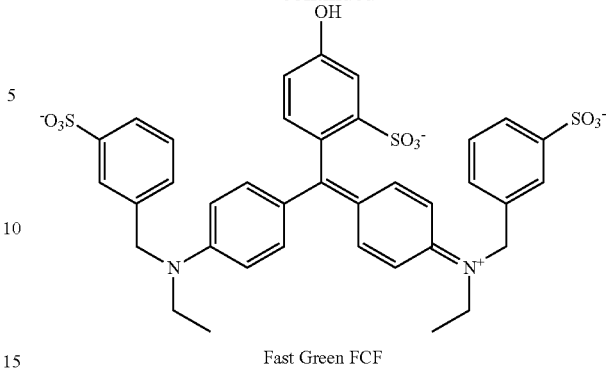

Fast Green FCF

Both of the green stains seek a —$R(C_6H_4)SO_3H$ end group on the target sites. This is realized by phenolsulfonic acid, $HO(C_6H_4)SO_3H$.

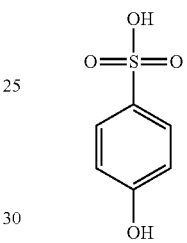

Bismarck Brown

Bismarck Brown is a diazo dye which is used to stain acid mucins.

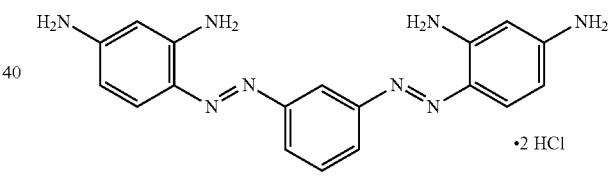

The key is to couple to the —$NH_2$ end group on the stain. The solution is to use a Tosyl coupling reaction wherein the following takes place:

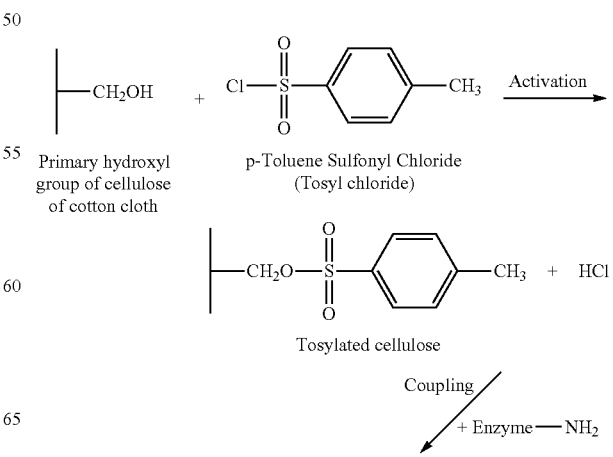

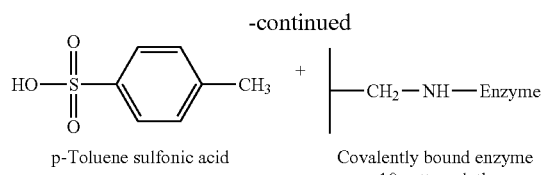

p-Toluene sulfonic acid    Covalently bound enzyme 10 cotton cloth

The solution is as follows:

A tosyl activator is applied p-Toluene Sulfonyl Chloride to a hydroxyl end group on the slide adhesive

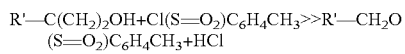

When the stain's —NH2 end group is presented the activator is released and the amine is captured.

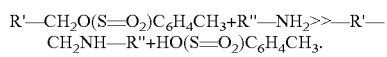

In one embodiment, the second row of stain targets supports special stains usage, if elected. These targets are inorganic, uniquely target a specific stain, and capture the specific stain with a covalent bond. The special stain reactive targets may be selected from but not limited to Alcian Blue, Bielschowsky Silver Stain, Bismarck Brown, Gram Stain, Cresyl Fontana Masson, Gordan and Sweet's Silver Staining, Light Green SF or Fast Green FCF, Grocott's Methanamine Silver Method, Hall's Bilirubin Stain, Luxol Fast Blue Mucicarmine, Muller-Mowry Colloidal Iron, New Methylene Blue, Nuclear Fast Red, Oil Red O, Orange G, PAS with Diastase Digestion, Periodic Acid Schiff (PAS), Phosphotungstic acid, Picro Sirius Red, Prussian Blue Reaction, Toluidine Blue Acidified, Trichrome-Gomori's One-Step, Trichrome-Masson's, Verhoff-Van Geison, Von Kossa, Weigert's Resorcin Fuchsin, Zeil-Neelsen.

In another embodiment, the preferred solution for H&E staining with the adhesive coated microscope slide is as follows:

The base version of the PRS-H&E supports only H&E targets. The targets are designed to react uniquely with Hematein+Mordant and Eosin Y. However, when the Mordant for Hematein is Phosphotungstic acid, an additional target site will be needed for the Phosphotungstic acid alone.
Hematein+Mordant
A blend of Polyphosphoric acid and Polyvinylalcohol to form, a five-element minimum, gradient density array following a dBd profile.
Eosin Y
Hydroquinone These inorganic target chemistries are not the only solutions possible, but they represent the viability of a target series that will singularly react with only one stain each in the H&E staining sequence. Those proficient in chemistry can develop alternate target formulations to achieve the same result, but it does not change the scope or outcome of the invention.

Immunohistochemical (IHC) staining in general, used to assess the presence of specific antigen sites in a patient tissue section. Subjective interpretation is applied against the stain density on the tissue section to assign the diagnostic level of an abnormal or cancerous condition. In general, there is an assumption that the IHC processing always functions correctly and that the tissue section would be marked with visible chromogen markers identifying the abnormal or cancerous conditions if they are present. However, failure of the antigen retrieval or stain reagents leaves no signature identifying artefacts. Thus, there is considerable opportunity for not being able to render a valid diagnostic determination on the part of the Lab Tech or Pathologist. In other words, the physical morphology may not be enough to signal an abnormal condition, but without the antigen sites being marked, the slide offers nothing more than would be found on a Hematoxylin and Eosin (H&E) slide.

There are some passed in requirements that are necessary in order to complete the calculations. The parameters need to be known are the following:

1. Antibody A: Dilution ratio, ID, and host species (example would be 25, ER, Mouse)
2. Antibody B: Dilution ratio and ID (example would be 20, Ki-67). The reason that the host species is not needed as whatever the Antibody A uses Antibody B must be the opposite Mouse/Rabbit.

It is known that the primary antibody is composed of processed host blood serum obtained from the host animal (Mouse or Rabbit) that was inoculated by the desired antigen fraction. The host then produces blood serum proteins where the antigen sites now contain the antibody reactant to the antigen antagonist. When the antibody is subsequently brought in contact with a protein that contains target antigen the antigen and antibody bind together. The result is that the host species of the antibody (Mouse or Rabbit) is left free to react with the secondary stain kit.

The foundation upon which the IHC targets can be used to develop antigen density ruler against the co-resident tissue section follows the following sequence:

The slide's adhesive binding site density exceeds the area displacement of a single protein by at least two orders of magnitude.

The primary antibody and secondary proteins have known atomic masses, kDa, which can be converted into weight as nanograms.

The primary and secondary targets have well defined and round deposition areas upon which the known dispensed volume of target material is applied. Since the protein deposits incorporate a cross-linking coupler they are not able to sink into the porosity of the slide coating more than a protein deep. Thus, knowing the protein's atomic mass, the number of proteins of each protein type in the deposit, and the target's area the target's active surface protein density can be computed.

The applied concentration, dispensed volume, and surface area on slide exposed to the reagent of primary antibody are known. It can be reasonably assumed that during the exposure time of the reagent that most of the suspended antibodies will have fallen down and been captured by receptive antigen sites. Only those that fall directly over antigen sites will become captured and the balance washed away by a buffer wash step. Thus, the deposited antibody concentration can be established if the concentration is greater than 25% above cutoff and less than 25% from saturation.

a. Cutoff is defined as insufficient target site density to capture the applied the protein concentration.

b. Saturation is defined as the inability to capture all of the applied protein concentration.

Knowing the primary dilution ration, the correct primary target density target can be chosen and the primary concentration can be validated.

Each secondary and primary target is a mix blend of [(Mouse or Rabbit)+(Donkey+crosslinker+fungal inhibitor)] or [(KLH with antigen A or KLH with antigen B)+(unconjugated KLH+crosslinker+fungal inhibitor)]. Each dot has the same volume of total proteins, but the mix ratio must be adjusted slightly as the atomic masses may be different between the proteins composing a specific target. For example,
- A. Mouse IgG=155 kDa
- B. Rabbit IgG=150 kDa
- C. Donkey IgG=160 kDa
- D. KLH subunits conjugated with antigen peptide strand, where the subunits are KLH1 and KLH2=350 & 390 kDa The 2D secondary target series ranges between 10 to 100% following a 20 log (dilution) profile, wherein the dilution ranges between 1:1 and 1,000:1. A single 2D/3D target is used to measure the stain density delta between a 2D base and the 3D particles. The delta can be applied to the balance of the 2D array to produce a color density scale that is a good match to the 3D behavior seen in or on the tissue section.

The secondary 100% 2D/3D and 2D targets verify that the two deposits are matching in regards to the 2D stain density. This is a verification that the 3D particle component did not consume enough of the 100% protein material to cause shifting of the 2D component.

The secondary stain incorporates an enzyme gain function between 1 and 20× that is a function of the construction of the stain reagent. Therefore, as the gain rises the lower concentration secondary target will shift into saturation whereas when the gain drops to one only the high concentration secondary targets will be visibly stained.

If the secondary target array is not covalently fixed there will be damage to the deposit from the antigen retrieval process that an IHC slide experiences. While that provides a measure of AR impact it is not useful in generating an antigen density scale that can be applied to the tissue as it will always be unknown what the AR impact to the tissue will be. Therefore, the antigen density scale can only reflect what is left on or within the tissue section. That is why two antigen retrieval targets are provided for the QC usage of evaluating the AR process.

Because of the considerable size difference between the secondary and primary target proteins the protein concentration density will be established by the primary proteins. If we accept the premise that the KLH subunits KLH1 & KLH2 have a 50:50 distribution then their average value, 370 kDa, can be used to set the primary target dilution.

With an average primary antibody atomic mass of 150 kDa, the weight of a single antibody is 150 kDa ($1.6605\times 10^{-12}$) which equates to a weight of $249\times 10^{-12}$ ng. If we elect to have a single area of the slide as the only part exposed then we can develop the amount of applied primary reagent. Therefore, with a closed capillary gap within inside dimensions of 20.3 mm²×0.14 mm high the volume is 57.2 µl Ratio for a target zone of 1 mm diameter, representing the area of one of the target dots, which yields 0.1 µl of the applied primary antibody reagent.

The primary antibody reagent is diluted from its concentrate to a range between 1 to 100 m/ml. Therefore, for the applied primary dilution of 1-100 m/ml the target is exposed to 0.1 to 1 µg of antibodies. Given the weight of the antibody is nominally 249×10-12 ηg the 1 mm target maximum protein exposure range will be 41.06 to 4106 antibodies.

To ensure 100% capture ability the primary target should have a safety factor of 100 to 1000×. Choosing the 1000× option then the primary target needs to contain $4\times 10^6$ antigen sites. While the KHL subunits are bigger than the applied antibodies, the increase is not enough to change the number of captured antibodies beyond 1:1. Each KLH subunit has an average atomic mass of 370 kDa which equates to a weight of $614.4\times 10^{-12}$ ng.

The volume of a protein molecule can be approximated very simply and reliably from the molecular weight of the protein and an average protein partial specific volume. (Partial specific volume=volume/molecular weight.) The average of experimentally determined partial specific volumes for soluble, globular proteins is ~0.73 cm³/g. This value varies from protein to protein, but the range is rather narrow. The equation reduces down to a protein volume of $\sim(1.212\times 10^3 \times MW)$ nm³. Thus, for the KLH subunit the individual volume is 448.44 nm³. If the protein is modeled as a sphere then the diameter of the sphere become $0.132*MW^{1/3}$ in nm. For the KLH subunit this is 9.436 nm.

For the target diameter of 1 mm a monolayer of the KLH subunits requires $11.237*10^{27}$ proteins. For the active target density of $4\times 10^6$ proteins the minimum dilution ratio becomes $1:2.8\times 10^{21}$. In practical terms, any dilution approaching 1:1000 is workable as the evaluation of the primary antibody is dominated by its active protein concentration. Thus, the target density is only limited by its low concentration floor value.

The secondary target arrays are stepped dilution increments between 1:1 and 1,000:1. A linear slope for the dilution occurs as −20 log (dilution), hereafter call dBd. For the dilution range listed between 1:1 and 1,000:1, the semi-log range is 0 to −60 dBd. Choosing −3 dBd dilution steps the secondary target dilutions become 0, −3, −6, −9, −12, −15, −18, −21 dBd.

The staining can experience saturation or cutoff as a function of the concentration of the primary antibody and the enzyme gain of the secondary stain kit. Saturation is when the density of the enzyme sites exceeds the capacity to precipitate colorant from the chromogen. In other words the stain color is as dark as can be realized. Cutoff occurs when the concentration of the primary antibody and enzyme gain of the secondary stain kit are too low, resulting in insufficient colorant precipitation to be seen. The two factors cause the darkness of the secondary line to shift to saturation (100%) or cutoff (0%). Based on FIG. 5, this movement is seen as the number of targets that are visible. As the secondary enzyme gain increases the 100% dot density shifts towards the 0% position. The common enzyme gains are 1, 2, 4, 5, 8, 10, 15, and 20. These translate into shifting the secondary array towards the 0% position by:
- 20× all targets shift −26 dBd
- 15× all targets shift −23.52
- 10× all targets shift −20
- 5× all targets shift −13.98
- 4× all targets shift −12.04
- 2× all targets shift −6.02
- 1× only 2D 100% dot near black If the primary target array is present an increase in secondary enzyme gain shifts the stain density towards the low primary concentration dot. The same is true if the primary antibody concentration is increased. The antigen retrieval process will cause both primary and secondary targets to be degraded to some level, which reverses the shift towards cutoff. If at the end of the IHC staining there are three or more dots that have disappeared the slide would be considered to have had excessive antigen retrieval duration, temperature, or both and too much antigen presence has been lost on the tissue making diagnostic interpretation marginal. This decision is independent of the efficacy of the primary antibody as the secondary staining is already been shown to be compromised. Nothing on the antibody step can overcome this damage level.

Typically, AR damage that shifts the secondary array towards the 100% position by three or more dots is considered to be excessive and the slide should be redone using a higher enzyme gain secondary stain kit or a higher concentration of antibody.

The primary antigen target color density is thus the collective sum of the antibody concentration times the enzyme gain of the secondary stain kit. While the secondary target density is only that of the enzyme gain times the secondary target protein concentration.

Depending on the digital imaging system, changes in the illumination intensity will shift the dynamic range of the image into compression (getting darker) or saturation (getting lighter). These changes will shift the antigen color scale while the antigen density numeric scale will not. Thus, the numeric scale is independent and the color scale dependent on the illumination intensity.

Figure 10:
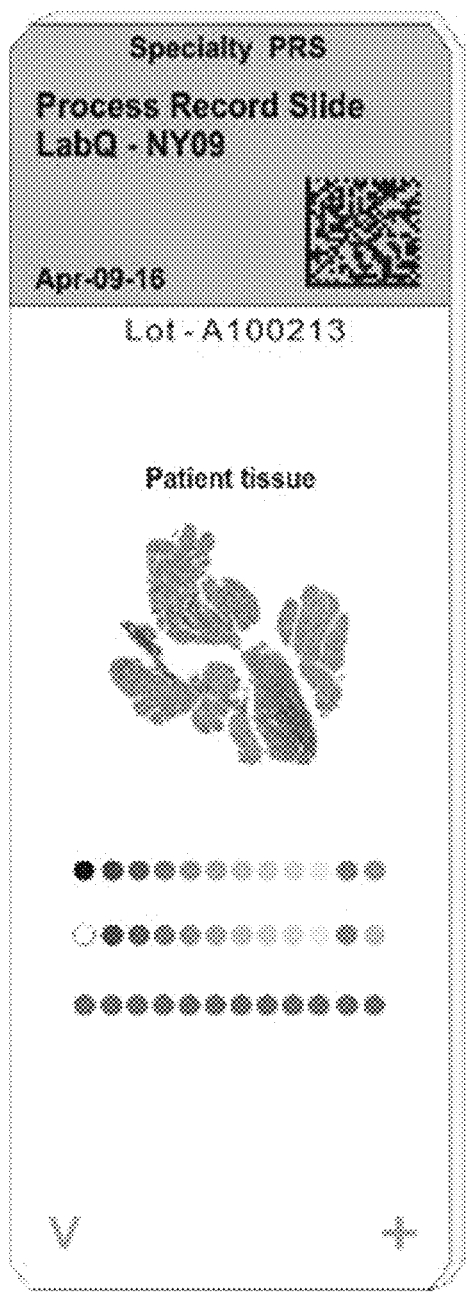
FIG. 10 shows a slide with a secondary protein concentration scale which has a co-resident tissue section and is subjected to IHC staining.

In QC mode the co-resident targets provide IHC process feedback as is illustrated in FIG. 10. There are four lines of secondary arrays shown with the difference being the degree of antigen retrieval performed from within nominal, over, very over, and excessively over, 5, 10, 30, and 40% respectively. The antigen retrieval process seeks to unmask the antigen sites by reversing the Schiff base bond between the formaldehyde and proteins. The speed at which the antigens become exposed is largely dependent upon the temperature of the reaction. As the temperature is increased, the opportunity occurs for nucleated boiling. The nucleated boiling causes physical damage to both the tissue and protein deposits. Ideally, the antigen retrieval activity is uniform through the slide, but in practice that does not occur, resulting is areas having more or less antigen retrieval activity dependent on the method and environment used. Assuming uniform antigen retrieval activity the following can be used to indicate that the slide will be usable for diagnostic determination:

If the AR is minimal or excessive, the secondary array may not be able to reflect the failure. The two AR targets however, will signal the excessive failure conditions.

Low AR is seen as the 2D/3D under fixed and 2D over fixed targets are both black. The secondary arrays will appear as perfect with no AR shifting left of the targets.

Low AR activity can occur from the following situations in the IHC stainer:
AR Heater not working or set well below 80° C.
AR buffer has a neutral pH 7, rather than 6 or 9
Exposure time too short High AR is seen as the 2D/3D under fixed is very bleached and the 2D over fixed target is less than 50% black. The secondary arrays will be largely bleached out as well.

High AR activity can occur from the following situations in the IHC stainer:
Heater operating at temperature >95° C.
Exposure time too long Chromogen precipitation error can arise under two situations:

If at the high concentration secondary targets the stain intensity dips rather than is at maximum darkness. The secondary array should be always increasing vs. site density. If not then the chromogen precipitation has exhausted the secondary reagent kit capacity. The solution is to increase the primary antibody dilution (same as reducing the antibody concentration).

The chromogen reagent has deteriorated since being activated (often occurs with DAB). The solution is to use a new DAB mixture.

Viewing a microscope slide through a conventional microscope is subjective in regards to the illumination level. In whole slide imaging (WSI), the scanner uses a perfect white and black hole to establish the white balance and contrast. Such is not the case with manual microscopes. FIG. 10 illustrates the effect to the image as the illumination level is too dark (−5% from optimal), optimal (+0), and too bright as in (+10 or +15%). When the light level is below optimal there is compression of stain density. In terms of cancer stages this could shift the diagnosis one stage higher than it should be. When the light level is above optimal there is bleaching of the image. In terms of cancer stages this could shift the diagnosis one stage lower than it should be. The antigen color density and numeric ruler is developed from the primary and secondary targets and can be superimposed upon the WSI image. The numerical scale is the independent term while the color density is the dependent term. When the antigen density color and numeric ruler is applied to the WSI the numeric scale remains fixed as the user shifts the illumination level up or down. The color density scale on the other hand shifts as the illumination level changes. The advantage is that the user has the choice to shift the apparent illumination up/down to best 'see' features on the tissue image while never losing the numeric relationship to color density. This will also be functional as the magnification is changed.

There are two forms by which the antigen density ruler can be developed. Type A is based on the assumption that the primary antibody is always applied with less than 10% excess antibody vs. tissue antigen sites. Type B uses the primary antigen gradient density array.

Type A: Secondary Only Based Antigen Ruler

This form uses only the secondary target array. The passed in information that is imbedded in the 2-D bar code includes the (a) primary antibody data: host species for the antibody and dilution in −dBd and (b) secondary enzyme gain.

The secondary gradient density target array is composed of known concentrations of proteins following an −3 dBd decrement between targets. The maximum concentration is chosen by the least dilution that is used for the primary antibody. Most users take the concentration specification provided by the antibody reagent manufacturer and dilute to a constant intermediate concentration of 1 ug/ml. From that all other dilutions are made as needed to accommodate the different tissue types. In general, the second set of primary antibody dilutions range between 1:1 and 1,000:1.

To accommodate the range of secondary enzyme gain the secondary array must be composed of a wider range of dilutions. Thus, with −3 dBd steps the lowest dilution of the secondary array starts at 1,000:1 or −60 dBd, which is represented by SdBd. The maximum of the 8-dot series then becomes −0 dBd or 1:1. The action of the antigen retrieval degrades the secondary proteins which is represented by ARdBd. Each dot, one of eight, in the secondary array represents an −3 dBd increment. The antigen retrieval loss for the loss of two targets (no longer visible) would be +6 dBd. This means the secondary array is (−S+AR)dBd for the 2D targets or [+6 to −54 dBd]. The antibody concentration and the secondary enzyme gain must now be factored in. The antibody concentration would be AdBd, while the enzyme gain is EdBd. Thus, the secondary array would be (−S+AR−E)dBd, while the tissue would be (+AR−E+A)dBd. The next factor that must be applied is the 100% 2D to 3D differential. The stain difference between the 3D objects in the 100% 2D/3D target and the 100% 2D represents the secondary stain chromogen precipitation constant, which is used to assign the color density to the numerical scale and is assigned to DdBd. The difference in color density is applied to each of the 2D targets in the array. Thus, the 2D array presents in stain color density as (+AR−E+A+D)dBd.

If for example, the enzyme gain was 10× then E=−20 dBd. The 2D secondary array would then become: −14, −17, −20, −23, −26, −29, blank, blank dBd. The two dots towards 0% having been damaged enough by the antigen retrieval process that they are unrecoverable by the staining and thus, blank. If for example the 2D/3D color density difference is 10× then D=+20 dBd bringing the 3D secondary array to −34, −37, −40, −43, −46, −49, blank, blank dBd. It is assumed that the primary antibody reagents will find suitable antigen sites in the primary targets that 100% yield takes place. It is also assumed that while there are many more than two antigen peptide strands per KLH protein that only one antibody can effectively bind and become stained per KLH protein. Any additional antibodies finding a suitable antigen on the same KLH protein will be prevented from completion by the secondary stain because of overlapping occupancy. Therefore, the number of antigen sites per primary antigen carried protein that can become detected is one. Since the primary targets contain the same number of proteins per micron as the secondary the primary dilution from the 500 ug/ml antibody master is then applied to the secondary array data to adjust the secondary color density to numeric antigen density. Monitoring the secondary targets, choose the target that has a middle color density. The middle color density being defined as the 50% point between maximum black and maximum white. The point then equates to 1.5 dBd out of the 3 dBd range. That point then functions as the anchor upon which the antigen density ruler is established. Using the last target range above the midpoint becomes −41.5 dBd.

The secondary proteins are diluted to a 10 ug/ml master dilution. Each array is a blend of Mouse or Rabbit mixed with Donkey IgG proteins. While the proteins all have different atomic masses the following will assume all are 150 kDa and that the total number of proteins per target dot is constant the mix ratio is not. For now, only the reactive protein concentration is being considered. At 150 kDa the individual protein molecular weight MW=249.07×10$^{-12}$ ng. The standard target dot is 1 mm in diameter. If the printed deposit is 1 μm thick, and the deposit concentration is 10 μg/ml, 31.5×10$^6$ proteins will be deposited. A 1 μm diameter area would then have 31.5 proteins. If we allow that one protein equates to 1 antigen site then the antigen density can be established. The secondary array uses the same number of proteins per deposit, but the ratio between Mouse or Rabbit and Donkey changes as the concentration of the Mouse or Rabbit is reduced. The 100% target is entirely Mouse or Rabbit and is matched to the 0 dBd point on the ruler.

The secondary will only stain on the tissue when a primary antibody binds to an antigen site on the tissue. It is not particularly dependent on the concentration of the applied antibody except that sufficient antibody concentration must be provided to bind to the available antigen sites. Thus, the antigen density measurement on the tissue remains as a constant, but the numeric values must be corrected for antigen retrieval damage and secondary enzyme gain. The color density vs. numeric measurement must then be harmonized.

In the previous example the enzyme gain is 10× and the antigen retrieval has caused the loss of two dots from the secondary array. The enzyme gain is −20 dBd while the antigen retrieval loss is +6 dBd. The result is −14 dBd. The dilutions then translate to:

| Numeric Density dBd | Color Density dBd | % Target Mouse/Rabbit: Donkey | Antigen Density Mouse/Rabbit in 1 μm$^2$ |
|---|---|---|---|
| 0 | −14 | 100 | 31.5 |
| −3 | −17 | 70.8 | 23.32 |
| −6 | −20 | 50.1 | 15.78 |
| −9 | −23 | 35.5 | 11.18 |
| −12 | −26 | 25.1 | 7.90 |
| −15 | −29 | 17.78 | 5.60 |
| −17 projected | −32 projected | 12.59 | 3.96 |
| −20 projected | −35 projected | 9.9 | 3.12 |

Type B: Primary Antigen Based Ruler

This form uses both the primary and secondary target arrays. The passed in information that is imbedded in the 2-D bar code includes the (a) primary antibody data: host species for the antibody and dilution in dB dilution and (b) secondary enzyme gain. The lot code data includes the information about which primary target combination is in use.

If a primary target series is present it would be 3-dots wherein the most concentrated dot would be at the same 100% concentration as the secondary array, but the dots are spaced apart in −6 dBd steps. In effect, the primary array and secondary array have the same dilution slope. The primary targets become: −0, −6, −12 dBd and are represented as PdBd. It is reasonable to expect that the antigen retrieval will damage will nearly identical to that of the secondary array. The primary array is acted upon by the secondary stain and thus experiences the same enzyme gain function. Thus, the primary array would be (−A+AR−E)dBd, where the primary target density is controlled by the primary antibody dilution. The only requirement is that P is always greater than A. For 10× enzyme gain=−20 dBd and +6 dbd antigen retrieval loss the primary array is −20, −26, −32 dBd. The antigen retrieval loss does not act upon the primary targets enough to blank them out, based on the impact to the secondary array. While the secondary array is sufficient to produce the antigen density rulers it is important to verify that the primary dilution was correctly applied. Thus, the primary targets function in that capacity.

This application incorporates the reference of the definition of a slide with a target protein concentration scale disclosed in application No. 62/520,319 entitled "Process Record Slide for Immunohistochemical Staining" into its entirety. The aforementioned slide with a target protein concentration scale as also defined in the application No. 62/520,319 is composed of two secondary protein target arrays at a minimum and optionally one or more primary antigen target arrays.

In one embodiment of the present invention, the aforementioned secondary protein target arrays are formed as two lines: one of Mouse IgG and the other Rabbit IgG mixed with a dummy IgG blood serum protein to form a five or more member gradient density series that progresses from max density to min density in a 20 log (dilution) curve, wherein the dilutions may range between 1:1 and 1,000:1.

In another embodiment, in the last process step those antigen sites identified become colored by chromogen precipitation. Thus, the Mouse & Rabbit target array reflects the 20 log (dilution) curve of secondary stain kit chromogen precipitation.

In another embodiment, the preferred solution for the method for forming the primary antigen density scale is predicated on successfully composing the target mixtures, depositing them onto the slide with a target protein concentration scale, and having a covalent bond between the adhesive and the target materials.

In another embodiment, deducing that the target arrays are successfully applied and the both the primary and secondary stain reagents perform reasonably then the curve fitting between the data sets can be easily done by computer algorithm. In another embodiment, the primary stain may be selected from any IHC approved antibody that uses a Mouse or Rabbit host protein that is not also conjugated to a fluorescent marker or integrated with an enzyme site (such as HRP or AP). In another embodiment, the secondary stain may be selected from but not limited to the secondary stains with enzyme gains of 1× through 25×, that are each uniquely independent between Mouse and Rabbit, which each use a different color chromogen.

In another embodiment of the present invention, it is pertinent to note that the performance result in an absolute basis on one slide may not be identical to another slide done at another time. This comes from the fact that the secondary stain kits vary in performance lot to lot as does the primary conjugated primary antibody. However, the performance for any one slide with a target protein concentration scale the antigen scale will be valid and give close equivalence to another done using different stain reagents.

In another embodiment, the primary antigen concentration scale is then applied to the co-resident tissue section to access the tissue section for detected cellular defects, such as cancer.

In another embodiment, the slide with a target protein concentration scale is descripted below:

A slide, comprising: a detection zone and a control zone, wherein the detection zone is a space for a tissue section or loose cells to be applied for processing through immunohistochemistry (IHC) and subsequently examination; and the control zone comprises one or more sets of primary and/or secondary target arrays, wherein the secondary target array includes one or more (eg. 1-50, 5-45, 10-40, 15-35 or 20-30, particularly, 1, 2, 3, 4, 5, 6, 7, 8, 9 or 10) secondary target loading dots (the dot can be of any regular or irregular shape, such as circle, ellipse, square, diamond, etc.), each secondary target loading dot is a mixture of host protein (eg. IgG) and dummy protein (eg. IgG) fixed to the slide in a certain proportion.

Term "dummy protein" means the protein that is unreactive to the secondary antibody and used to mix with host protein to get gradient dilutions. Preferred dummy protein is donkey protein (IgG) or horse protein (IgG).

Term "host protein" means the protein (especially IgG) which has the same origin as the primary antibody, such as mouse, rat, rabbit, donkey, horse, and goat protein (IgG).

One example of the slide is shown in FIG. 3 with a detailed identification of the targets in FIG. 5.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

EXAMPLES

The below mentioned examples are illustrated for a way for working of the invention and should not be construed to limit the scope of the invention.

Example 1

Spray Application Method:
Spray over the surface with low airflow. A low liquid to air mix is preferred. The mixture is sprayed onto the slide, through a mask, to cover the PRS targets. Typically takes 1-2 passes to form a layer <5 microns thick. The paraffin mixture reservoir and spray head are both heated to slightly higher than 56° C. to ensure the paraffin is a fluid and will remain as a fluid while in flight from the spray head to the slide. Spray coverage from the head is nominally 0.375" in width, but a mask may be used for smaller shield areas. A post infrared reheat ensures 100% sealing.

Example 2

Screen Printing Method:
The stainless steel screen will be heated by passing an electric current through the wires of the screen between two parallel sides. The temperature of the screen needs to be slightly below the paraffin melt temperature so that paraffin does not weep through to the bottom side of the screen. Basically, the paraffin behaves more as a paste than a liquid. The PRS will need a reheat cycle to ensure 100% sealing.

Example 3

Ink Jet Method:
The inkjet head needs to have an integrated heater within the print head to keep the paraffin in a liquid state. A post reheat cycle on the slide will ensure 100% sealing.

Example 4

Roller Transfer Printing Method:
A heated roller pulls up a film of paraffin from a heated reservoir onto the roller. The roller then transfers a film of paraffin onto the slide much in the same fashion as a painting a wall with a napped roller. A post reheat cycle on the slide will ensure 100% sealing.

Example 5

FIG. 2 illustrates an H&E usage slide that contains one line of targets, bounded on the ends by black and white pigment targets. The pigment targets are printed separately from the special stains targets. The black/white targets are printed using a modified dispensing pump. The dispensing pump applies a spit and suck cycle to the epoxy mixture fed down a hollow tube that is held to the slide surface. When the print head lifts following the spit and suck cycle the deposit remains as a dot. The balance of the chemical targets are printed at another station and the slide passed through a UV exposed tunnel, initiating the anhydride catalyzer to cure the epoxy.

The epoxy plus anhydride is purchased pre-mixed. To ensure homogeneity the epoxy mixture is stirred and then degassed. The paint/ink is purchased with the pigment already blended in. Such a paint/ink is available from a number of vendors, but in all cases the formulation is proprietary to the vendor and will likely be different from each vendor. Viscosity is adjusted as needed using the recommended thinner the vendor supplies. The white pigment is barium sulfate which avoids most chemical interactions with the special stains. This is contrast to titanium dioxide or aluminum oxide, which may react with the Eosin Y.

Example 6 Spray Application Method for Paraffin Shield Coating

Spray over the surface with low airflow. A low liquid to air mix is preferred. The mixture is sprayed onto the slide, through a mask, to cover the PRS targets. Typically takes 1-2 passes to form a layer <5 microns thick without the need to reheat to flow the paraffin seal. The paraffin mixture reservoir and spray head are both heated to slightly higher than 56° C. to ensure the paraffin is a fluid and will remain as a fluid while in flight from the spray head to the slide. Spray coverage from the head is nominally 0.375" in width. If a single pass then will need a reheat to ensure 100% sealing.

Example 7 Screen Printing Method for Paraffin Shield Coating

The stainless steel screen will be heated by passing an electric current through the wires of the screen between two parallel sides. The temperature of the screen needs to be slightly below the paraffin melt temperature so that paraffin does not weep through to the bottom side of the screen. Basically, the paraffin behaves more as a paste than a liquid. The PRS will need a reheat cycle to ensure 100% sealing.

Example 8 Ink Jet Method for Paraffin Shield Coating

The inkjet head needs to have an integrated heater within the print head to keep the paraffin in a liquid state. A post reheat cycle on the slide will ensure 100% sealing.

Example 9 Roller Transfer Printing Method for Paraffin Shield Coating

A heated roller pulls up a film of paraffin from a heated reservoir onto the roller. The roller then transfers a film of paraffin onto the slide much in the same fashion as a painting a wall with a napped roller. A post reheat cycle on the slide will ensure 100% sealing.

Example 9 Antigen Retrieval Exposure Vs. Degradation to the PRS Targets

The test study sought to verify that the changes in AR exposure would be seen in the 2D secondary targets and the AR targets.

The expected result was a linear slope of exposure time and protein degradation. The outcome was however not so. This was because the AR buffer is not applied to the slide in a preheated heated state, rather it must be heated to the operating temperature between 92° C. and 95° C. Thus, ignoring the time it takes to get the AR buffer above 89° C. the slope is then linear. Using an 8-bit digitization with the PRS black/white targets to set the white balance and contrast optimally, the slope was 1.3 lsb/minute, +/−0.2 lsb. Exceeding 20 minutes past the 89° C. time mark, the 50% target was under serious stress and the usefulness of the secondary target series was compromised.

Example 10 Consistency of the Secondary Targets

The test study had two factors being explored:
I. Dot-to-dot between slides within a single mixed batch of the secondary proteins.
II. Dot-to-dot between slides of different builds of the secondary protein arrays.

Single mixed batch testing used the 100% and 40% target formulations. One hundred slides were printed and all processed with a Avidin-Biotin Complex (ABC) type Mouse & Rabbit secondary stain kit from Scytek. Antigen retrieval was not performed as it only adds an additional variable. The distribution of both was within 1.5%.

Example 11 Selection of Dummy Protein

Ten different secondary dilution groups were made from two different lots of Mouse, Rabbit, and Bovine IgG proteins. The dilutions were 100, 40, and 20% of Mouse & Bovine and Rabbit & Bovine. The distribution was within 1.5% for the 100 and 40% dilution groups. The 20% dilution groups showed an unexpected increase in stain density. It was from this data that we discovered the interaction between the Bovine and the Biotinylated Goat-anti-Polyvalent reagent of the ABC stain kit. The problem was solved by replacing the Bovine with Donkey. The test was repeated and the 20% group now stayed within 1.5%.

Example 12 the Quality Control Use of the PRS-IHC

In QC mode, the co-resident targets provide IHC process feedback as is illustrated in FIG. 5. There are four lines of secondary arrays shown with the difference being the degree of antigen retrieval performed from within nominal, over, very over, and excessively over, 5, 10, 30, and 40% respectively. The antigen retrieval process seeks to unmask the antigen sites by reversing the Schiff base bond between the formaldehyde and proteins. The speed at which the antigens become exposed is largely dependent upon the temperature of the reaction. As the temperature is increased, the opportunity occurs for nucleated boiling. The nucleated boiling causes physical damage to both the tissue and protein deposits. Ideally, the antigen retrieval activity is uniform through the slide, but in practice that does not occur, resulting is areas having more or less antigen retrieval activity dependent on the method and environment used. Assuming uniform antigen retrieval activity the following can be used to indicate that the slide will be usable for diagnostic determination.

If the AR is minimal or excessive, the secondary array may not be able to reflect the failure. The two AR targets however, will signal the excessive failure conditions.

a. Low AR is seen as the 2D/3D under fixed and 2D over fixed targets are both black. The secondary arrays will appear as perfect with no AR shifting left of the targets. Low AR activity can occur from the following situations in the IHC stainer:

i. AR Heater not working or set well below 80° C.

ii. AR buffer has a neutral pH 7, rather than 6 or 9 iii. Exposure time too short b. High AR is seen as the 2D/3D under fixed is very bleached and the 2D over fixed target is less than 50% black. The secondary arrays will be largely bleached out as well. High AR activity can occur from the following situations in the IHC stainer:
i. Heater operating at temperature >95° C.
ii. Exposure time too long
c. Chromogen precipitation error can arise under two situations:
i. If at the high concentration secondary targets the stain intensity dips rather than is at maximum darkness. The secondary array should be always increasing vs. site density. If not then the chromogen precipitation has exhausted the secondary reagent kit capacity. The solution is to increase the primary antibody dilution (same as reducing the antibody concentration).
ii. The chromogen reagent has deteriorated since being activated (often occurs with DAB). The solution is to use a new DAB mixture.

The staining can experience saturation or cutoff as a function of the concentration of the primary antibody and the enzyme gain of the secondary stain kit. Saturation is when the density of the enzyme sites exceeds the capacity to precipitate colorant from the chromogen. In other words the stain color is as dark as can be realized. Cutoff occurs when the concentration of the primary antibody and enzyme gain of the secondary stain kit are too low, resulting in insufficient colorant precipitation to be seen. The two factors cause the darkness of the secondary line to shift to saturation (100%) or cutoff (0%). Based on FIG. 5, this movement is seen as the number of targets that are visible. As the secondary enzyme gain increases the 100% dot density shifts towards the 0% position. The common enzyme gains are: 1, 2, 4, 5, 8, 10, 15, and 20. These translate into shifting the secondary array towards the 0% position by:
1. 20× all targets shift −26 dBd
2. 15× all targets shift −23.52
3. 10× all targets shift −20
4. 5× all targets shift −13.98
5. 4× all targets shift −12.04
6. 2× all targets shift −6.02
7. 1× only 2D 100% dot near black If the primary target array is present an increase in secondary enzyme gain shifts the stain density towards the low primary concentration dot. The same is true if the primary antibody concentration is increased. The antigen retrieval process will cause both primary and secondary targets to be degraded to some level, which reverses the shift towards cutoff. If at the end of the IHC staining there are three or more dots that have disappeared the slide would be considered to have had excessive antigen retrieval duration, temperature, or both and too much antigen presence has been lost on the tissue making diagnostic interpretation marginal. This decision is independent of the efficacy of the primary antibody as the secondary staining is already been shown to be compromised. Nothing on the antibody step can overcome this damage level.

Example 13 PRS Tracks Illumination Level with its Antigen Density Scale

Figure 6:
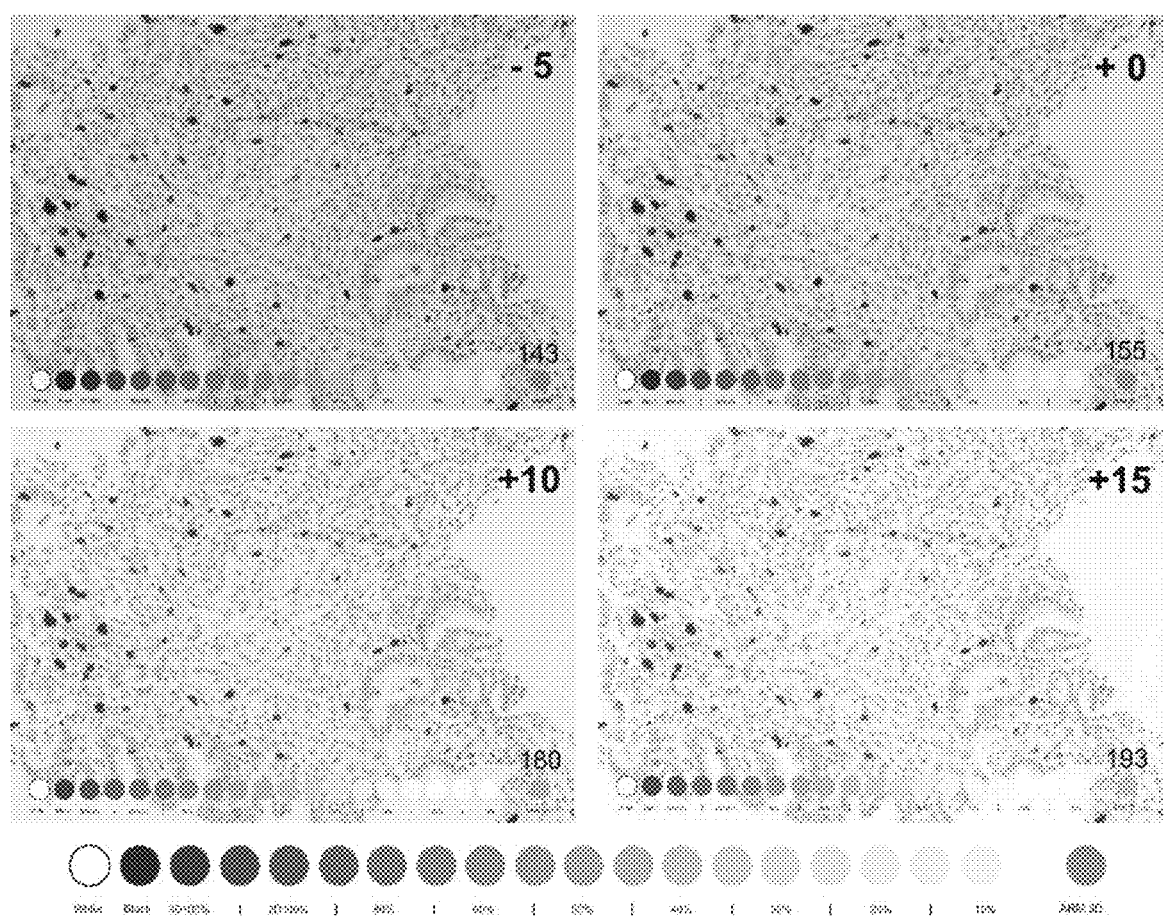
FIG. 6 illustrates the effect to the image as the illumination level is too dark (−5% from optimal), optimal (+0), and too bright as in (+10 or +15%).

Viewing a microscope slide through a conventional microscope is subjective in regards to the illumination level. In whole slide imaging (WSI), the scanner uses a perfect white and black hole to establish the white balance and contrast. Such is not the case with manual microscopes. FIG. 6 illustrates the effect to the image as the illumination level is too dark (−5% from optimal), optimal (+0), and too bright as in (+10 or +15%). When the light level is below optimal there is compression of stain density. In terms of cancer stages this could shift the diagnosis one stage higher than it should be. When the light level is above optimal there is bleaching of the image. In terms of cancer stages this could shift the diagnosis one stage lower than it should be. The antigen color density and numeric ruler is developed from the primary and secondary targets and can be superimposed upon the WSI image. The numerical scale is the independent term while the color density is the dependent term. When the antigen density color and numeric ruler is applied to the WSI the numeric scale remains fixed as the user shifts the illumination level up or down. The color density scale on the other hand shifts as the illumination level changes. The advantage is that the user has the choice to shift the apparent illumination up/down to best 'see' features on the tissue image while never losing the numeric relationship to color density. This will also be functional as the magnification is changed.

Example 14 Construction of Antigen Density Ruler

There are two forms by which the antigen density ruler can be developed.
1. Type A is based on the assumption that the primary antibody is always applied with less than 10% excess antibody vs. tissue antigen sites.
2. Type B uses the primary antigen gradient density array.

Type A: Secondary Only Based Antigen Ruler

This form uses only the secondary target array. The passed in information that is imbedded in the 2D bar code includes the (a) primary antibody data: host species for the antibody and dilution in −dBd and (b) secondary enzyme gain.

The secondary gradient density target array is composed of known concentrations of proteins following an −3 dBd decrement between targets. The maximum concentration is chosen by the least dilution that is used for the primary antibody. Most users take the concentration specification provided by the antibody reagent manufacturer and dilute to a constant intermediate concentration of 1 ug/ml. From that all other dilutions are made as needed to accommodate the different tissue types. In general, the second set of primary antibody dilutions range between 1:1 and 1,000:1.

To accommodate the range of secondary enzyme gain the secondary array must be composed of a wider range of dilutions. Thus, with −3 dBd steps the lowest dilution of the secondary array starts at 1,000:1 or −60 dBd, which is represented by SdBd. The maximum of the 8-dot series then becomes −0 dBd or 1:1. The action of the antigen retrieval degrades the secondary proteins which is represented by ARdBd. Each dot, one of eight, in the secondary array represents an −3 dBd increment. The antigen retrieval loss for the loss of two targets (no longer visible) would be +6 dBd. This means the secondary array is (−S+AR)dBd for the 2D targets or [+6 to −54 dBd]. The antibody concentration and the secondary enzyme gain must now be factored in. The antibody concentration would be AdBd, while the enzyme gain is EdBd. Thus, the secondary array would be (−S+AR−E)dBd, while the tissue would be (+AR−E+A)dBd. The next factor that must be applied is the 100% 2D to 3D differential. The stain difference between the 3D objects in the 100% 2D/3D target and the 100% 2D represents the secondary stain chromogen precipitation constant, which is used to assign the color density to the numerical scale and is assigned to DdBd. The difference in color density is applied to each of the 2D targets in the array. Thus, the 2D array presents in stain color density as (+AR−E+A+D)dBd.

If the enzyme gain was 10× then E=−20 dBd. The 2D secondary array would then become: −14, −17, −20, −23, −26, −29, blank, blank dBd. The two dots towards 0% having been damaged enough by the antigen retrieval process that they are unrecoverable by the staining and thus, blank. If for example the 2D/3D color density difference is 10× then D=+20 dBd bringing the 3D secondary array to −34, −37, −40, −43, −46, −49, blank, blank dBd. It is assumed that the primary antibody reagents will find suitable antigen sites in the primary targets that 100% yield takes place. It is also assumed that while there are many more than two antigen peptide strands per KLH protein that only one antibody can effectively bind and become stained per KLH protein. Any additional antibodies finding a suitable antigen on the same KLH protein will be prevented from completion by the secondary stain because of overlapping occupancy. Therefore, the number of antigen sites per primary antigen carried protein that can become detected is one. Since the primary targets contain the same number of proteins per micron as the secondary the primary dilution from the 500 ug/ml antibody master is then applied to the secondary array data to adjust the secondary color density to numeric antigen density. Monitoring the secondary targets, choose the target that has a middle color density. The middle color density being defined as the 50% point between maximum black and maximum white. The point then equates to 1.5 dBd out of the 3 dBd range. That point then functions as the anchor upon which the antigen density ruler is established. Using the last target range above the midpoint becomes −41.5 dBd.

The secondary proteins are diluted to a 10 μg/mL master dilution. Each array is a blend of Mouse or Rabbit mixed with Donkey IgG proteins. While the proteins all have different atomic masses the following will assume all are 150 kDa and that the total number of proteins per target dot is constant the mix ratio is not. For now, only the reactive protein concentration is being considered. At 150 kDa the individual protein molecular weight MW=249.07×10$^{-12}$ ng. The standard target dot is 1 mm in diameter. If the printed deposit is 1 μm thick, and the deposit concentration is 10 μg/mL, 31.5×10$^6$ proteins will be deposited. A 1 μm diameter area would then have 31.5 proteins. If we allow that one protein equates to 1 antigen site then the antigen density can be established. The secondary array uses the same number of proteins per deposit, but the ratio between Mouse or Rabbit and Donkey changes as the concentration of the Mouse or Rabbit is reduced. The 100% target is entirely Mouse or Rabbit and is matched to the 0 dBd point on the ruler.

The secondary will only stain on the tissue when a primary antibody binds to an antigen site on the tissue. It is not particularly dependent on the concentration of the applied antibody except that sufficient antibody concentration must be provided to bind to the available antigen sites. Thus, the antigen density measurement on the tissue remains as a constant, but the numeric values must be corrected for antigen retrieval damage and secondary enzyme gain. The color density vs. numeric measurement must then be harmonized.

In the previous example the enzyme gain is 10× and the antigen retrieval has caused the loss of two dots from the secondary array. The enzyme gain is −20 dBd while the antigen retrieval loss is +6 dBd. The result is −14 dBd. The dilutions then translate to:

| Numeric Density dBd | Color Density dBd | % Target Mouse/Rabbit: Donkey | Antigen Density Mouse/Rabbit in 1 μm² |
|---|---|---|---|
| 0 | −14 | 100 | 31.5 |
| −3 | −17 | 70.8 | 23.32 |
| −6 | −20 | 50.1 | 15.78 |
| −9 | −23 | 35.5 | 11.18 |
| −12 | −26 | 25.1 | 7.90 |
| −15 | −29 | 17.78 | 5.60 |
| −17 | −32 | 12.59 | 3.96 |
| −20 | −35 | 9.9 | 3.12 |

Type B: Primary Antigen Based Ruler

This form uses both the primary and secondary target arrays. The passed in information that is imbedded in the 2D bar code includes the (a) primary antibody data: host species for the antibody and dilution in dBd and (b) secondary enzyme gain. The lot code data includes the information about which primary target combination is in use.

If a primary target series is present it would be 3-dots wherein the most concentrated dot would be at the same 100% concentration as the secondary array, but the dots are spaced apart in −6 dBd steps. In effect, the primary array and secondary array have the same dilution slope. The primary targets become: −0, −6, −12 dBd and are represented as PdBd. It is reasonable to expect that the antigen retrieval will damage will nearly identical to that of the secondary array. The primary array is acted upon by the secondary stain and thus experiences the same enzyme gain function. Thus, the primary array would be (−A+AR−E)dBd, where the primary target density is controlled by the primary antibody dilution. The only requirement is that P is always greater than A. For 10× enzyme gain=−20 dBd and +6 dbd antigen retrieval loss the primary array is −20, −26, −32 dBd. The antigen retrieval loss does not act upon the primary targets enough to blank them out, based on the impact to the secondary array. While the secondary array is sufficient to produce the antigen density rulers it is important to verify that the primary dilution was correctly applied. Thus, the primary targets function in that capacity.

Example 15 Testing of Each Stain Target or Gradient Density Target Set

H&E (FIG. 2), PAP-M (FIG. 8), and PAP-A (FIG. 9) slides were manufactured, which share the same top line of targets for hematoxylin and eosin stain testing. The second line of both Pap slides contains targets for phosphotungstic acid, Orange G, Light Green SF or Fast Green FCF, and Bismarck Brown. It could be seen that PAP-A comprises the targets of all three slides, thus the PAP-A slide would function well to test all elements of the three slide types. The testing was broken into four groups depending on how the stain behaved.

Test A: Binary testing of stain presence for Orange G, Light Green SF or Fast Green FCF, and Bismarck Brown. The testing simply exposes a slide to one of the listed stains to confirm that the correct capture target is stained while the balance of the targets do not stain.

Test B: pH based testing of Eosin Y. The test forces the pH of the Eosin Y to 4.5, 5.5, and 6.5. Both the low and high pH conditions should stain very poorly, while the mid-range pH target stains correctly.

Test C: Concentration based testing of Hematoxylin. The test starts with the concentration as freshly made in a 50 ml quantity in a tall 27 mm ID jar. A slide is stained, and the concentrate allowed to sit for 30-minutes with air bubbling through the liquid to force oxidation.

The test continues for 4 hrs.

Test D: Effect of pH on phosphotungstic acid. Stain performance changes as pH drops from 8.5 to 7.

Test A results: Standard concentration mixtures in 50 ml quantity in a tall 27 mm ID jar were made for each stain. Each stain was tested 3 times to show replication. All slides showed the correct target becoming stained with no other target also being stained.

Test B results: A 5-slide storage tube was filled with a purchased ready to use fresh Eosin Y. The container holds about 20 ml of reagent. The testing was done in pairs: normal and low pH followed by normal and high pH. Nominal pH was set to 4.5 through adjustment with boron hydrate and boric acid as needed. Three slides per test cycle were made. Following the normal baseline slide staining the pH was lowered to 3.5 and new slides stained. Following the normal baseline staining the pH was raised to 5.5 and new slides stained. As expected the stain density was with 1% for each slide set and fell by nearly 50% with the pH changes.

Test C results: Hematoxlyin was purchased as Mayer's Hemalum solution. The targets started out all in saturation and over time the gradient scale showed as the oxidation of the reagent continued. The test accelerated the degradation to show the behavior. By the time that 4 hrs had passed the 100% target had degraded by over 50%.

Test D results: Phosphotungstic acid was mixed in a standard 50 ml quantity in a tall 27 mm ID jar and adjusted for pH with HCl to 8.5. A slide was stained and the pH dropped by 0.5 pH. The test cycle was repeated until pH was 7. As expected, all the targets were in saturation at pH 8.5. When pH dropped to 7 the gradient density scale was visible and the 100% target at about 30% loss in color density.

The invention claimed is:

1. A microscope slide with a paraffin shield coating, wherein
the paraffin shield coating is coated on a biomaterial and an inorganic deposit on the microscope slide,
the biomaterial is selected from a protein, a peptide, a conjugated protein, a protein coated bead, a peptide coated bead, and a conjugated coated bead which reacts with applied antibody and secondary stain reagents, or a combination thereof, and
the inorganic deposit is selected from an inorganic target and an imaging reference target, or a combination thereof, and the inorganic deposit is located on the microscope slide separate from the biomaterial, and
the paraffin shield coating is coated on the microscope slide by following steps:
(a) melting a solid paraffin at a temperature in the range of 60 to 75° C. until the solid paraffin melts into a liquid paraffin;
(b) adding a solvent to the liquid paraffin obtained in step (a) until a saturation mixture is obtained;
(c) allowing the saturation mixture obtained in step (b) to cool in a temperature between 30 and 33° C., followed by slowly adding a solvent until a clear paraffin liquid is obtained;
(d) applying a layer of the clear paraffin liquid resultant in step (c) over the biomaterial and the inorganic deposit on the microscope slide to form the paraffin shield coating over all or a selective area of the microscope slide;
(e) applying infrared heat to evaporate the solvent from the paraffin shield coating and thereby returning it to its hardened and solid state,
the solvent is selected from xylene, Aliphatic xylene substitute, Toluene, Paint thinner, Turpentine, a 50:50 mix of Acetone & Kerosene, or a mixture of the listed solvents thereof.

2. The microscope slide as claimed in claim 1, wherein the solid paraffin is purified and water free.

3. The microscope slide as claimed in claim 1, wherein the solid paraffin has a melting temperature of 50-60° C.

4. The microscope slide as claimed in claim 1, wherein the solid paraffin has a melting temperature of 50-54° C.

5. The microscope slide as claimed in claim 1, wherein the solvent is xylene, Xylol, or Toluene.

6. The microscope slide as claimed in claim 1, wherein the paraffin shield coating has a thickness between 1 and 5 microns.

7. The microscope slide as claimed in claim 1, wherein the imaging reference target is a pigment colored deposit.

8. The microscope slide as claimed in claim 1, wherein the inorganic target is a compound reacting to a stain selected from Alcian Blue, Analine Blue-Orange G Solution, Azan Stain, Bielschowsky silver stain, Brow & Benn-Gramm Stain, Cresyl Violet, DAB, Fontana Masson, Gordon and Sweet's silver staining, Grocett's Methanamine silver method, Hall's Bilirubin stain, Jones Methanamine silver, Luxol Fast Blue, Luxol Fast Blue-Cresyl Mucicarmine, Muller-Mowry colloidal Iron, Orange G, Nuclear Fast Red, PAS with Diastase Digestion, Periodic Acid Schiff (PAS), Phosphotungstic Acid, Haematoxylin, Picro Sirius Red, Toluidine Blue Acidified, Trichrome Gomoris One-Step, Trichrome-Masson's, Victoria Blue, Von Kossa, Weigert's Resorcin Fuchsin, Weigert's Iron Haematoxylin, Zell-Neelsen.

9. The microscope slide as claimed in claim 1, wherein in step (d), the clear paraffin liquid obtained in step (c) is applied through spray application method, inkjet deposit method, transfer printing method, screen printing method, or vapor deposition method.

10. The microscope slide as claimed in claim 1, wherein the microscope slide is either glass or plastic slide.

11. The microscope slide as claimed in claim 1, wherein the paraffin shield coating is used to protect the biomaterial and the inorganic deposit on the microscope slide from oxidation or microbial attack and inorganics from reactions resulting in oxidation or airborne delivered acid or caustic materials.

12. The microscope slide as claimed in claim 1, wherein the paraffin shield coating is used to increase the shelf life of the biomaterial and the inorganic deposit on the microscope slide.

13. The microscope slide as claimed in claim 6, wherein the paraffin shield coating has a thickness between 2 to 3 microns.

14. The microscope slide as claimed in claim 7, wherein the imaging reference target comprises black and white pigments.

15. The microscope slide as claimed in claim 1, wherein the paraffin shield coating is removable from at least one of the biomaterial or the inorganic deposit.

16. A microscope slide with a paraffin shield coating, wherein
the paraffin shield coating is coated on a biomaterial and an inorganic deposit on the microscope slide, wherein the paraffin shield coating is removable from at least one of the biomaterial or the inorganic deposit, the biomaterial is selected from a protein, a peptide, a conjugated protein, a protein coated bead, a peptide coated bead, and a conjugated coated bead which reacts with applied antibody and secondary stain reagents, or a combination thereof, and the inorganic deposit is selected from an inorganic target and an imaging reference target, or a combination thereof, and the paraffin shield coating is coated on the microscope slide by following steps:
- (a) melting a solid paraffin at a temperature in the range of 60 to 75° C. until the solid paraffin melts into a liquid paraffin;
- (b) adding a solvent to the liquid paraffin obtained in step (a) until a saturation mixture is obtained;
- (c) allowing the saturation mixture obtained in step (b) to cool in a temperature between 30 and 33° C., followed by slowly adding a solvent until a clear paraffin liquid is obtained;
- (d) applying a layer of the clear paraffin liquid resultant in step (c) over the biomaterial and the inorganic deposit on the microscope slide to form the paraffin shield coating over all or a selective area of the microscope slide;
- (e) applying infrared heat to evaporate the solvent from the paraffin shield coating and thereby returning it to its hardened and solid state.

17. The microscope slide as claimed in claim 16, wherein the biomaterial is located on the microscope slide at a location separated from the inorganic deposit.

* * * * *